US011762158B2

(12) United States Patent
Lovato

(10) Patent No.: US 11,762,158 B2
(45) Date of Patent: Sep. 19, 2023

(54) OPTICAL TUBE FOR AN OPTOELECTRONIC DEVICE, AND OPTOELECTRONIC DEVICES COMPRISING IT

(71) Applicant: DATALOGIC IP TECH S.R.L., Calderara di Reno (IT)

(72) Inventor: Piero Lovato, Borgonuovo di Sasso Marconi (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 0 days.

(21) Appl. No.: 17/373,538

(22) Filed: Jul. 12, 2021

(65) Prior Publication Data
US 2022/0019037 A1    Jan. 20, 2022

(30) Foreign Application Priority Data
Jul. 15, 2020    (EP) .................................... 20425026

(51) Int. Cl.
*G02B 6/42*    (2006.01)
(52) U.S. Cl.
CPC ......... *G02B 6/4262* (2013.01); *G02B 6/4214* (2013.01)
(58) Field of Classification Search
CPC ............... G02B 6/4262; G02B 6/4214; G02B 19/0061; G02B 19/0076; G02B 19/0085; G02B 27/0018
See application file for complete search history.

(56) References Cited

U.S. PATENT DOCUMENTS

| 4,535,024 | A | * | 8/1985 | Parker ....................... B44F 1/02 428/209 |
| 5,748,816 | A | | 5/1998 | Jaksic et al. |
| 9,200,955 | B2 | | 12/2015 | Kawabata et al. |
| 2010/0091499 | A1 | * | 4/2010 | Jiang .................. G02B 19/0066 362/268 |
| 2011/0194295 | A1 | | 8/2011 | Householder et al. |

(Continued)

FOREIGN PATENT DOCUMENTS

| DE | 20 2011 000 876 U1 | 9/2012 |
| EP | 1 650 786 A1 | 4/2006 |

(Continued)

OTHER PUBLICATIONS

European Search Report corresponding to European Application No. 20425026.0, dated Dec. 15, 2020, 6 pages.

*Primary Examiner* — Ellen E Kim
(74) *Attorney, Agent, or Firm* — Foley & Lardner LLP

(57) ABSTRACT

An optoelectronic device, e.g. of a photocell or light barrier, comprising an electrical-to-optical or optical-to-electrical transducer, and an optical tube assembly comprising an optical chamber, a first aperture proximal with respect to the transducer, and a second, distal aperture being formed in chamber wall. In at least one first half-section taken e.g. along optical axis, at least an intermediate portion of the chamber wall extending between a first and a second line has a local tangent at each point (P) oriented so that any stray light ray incoming from the boundary point of the first aperture in the opposite half-section would be so deviated at that point (P) as to impinge upon the chamber wall at an impingement point (Q) in said first halfsection and more distal than the distal line.

20 Claims, 9 Drawing Sheets

(56) References Cited

U.S. PATENT DOCUMENTS

| | | | |
|---|---|---|---|
| 2018/0165489 A1 | 6/2018 | McQueen et al. | |
| 2018/0187866 A1* | 7/2018 | Huang | G02B 27/30 |
| 2019/0072240 A1 | 3/2019 | Dodo et al. | |
| 2019/0171854 A1 | 6/2019 | Vonmetz et al. | |
| 2019/0310345 A1* | 10/2019 | Nagaishi | H01Q 21/06 |

FOREIGN PATENT DOCUMENTS

| | | |
|---|---|---|
| JP | 3862741 B2 | 12/2006 |
| WO | WO-99/08144 A1 | 2/1999 |

* cited by examiner

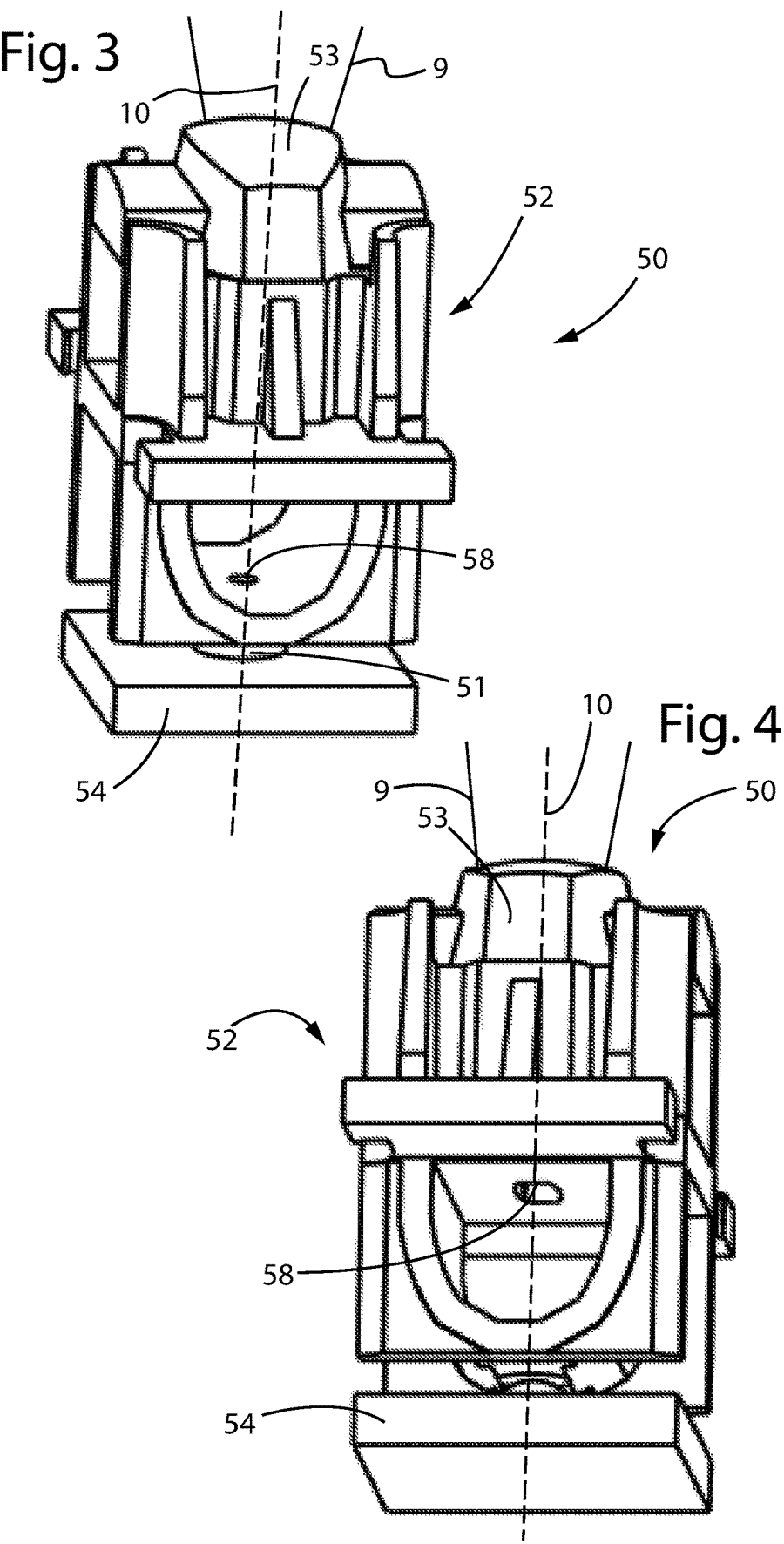

OPTICAL TUBE FOR AN OPTOELECTRONIC DEVICE, AND OPTOELECTRONIC DEVICES COMPRISING IT

RELATED APPLICATIONS

This Application claims priority to co-pending non-provisional European patent application having serial no. 20425026.0 filed on Jul. 15, 2020 with title "Optical Tube for an Optoelectronic Device, and Optoelectronic Devices Comprising It;" the contents of which are hereby incorporated by reference in their entirety.

FIELD OF THE INVENTION

The present invention concerns an optical tube for an optoelectronic device, and optoelectronic devices comprising such optical tube(s).

BACKGROUND

An optoelectronic device includes at least one transducer being an optical-to-electrical transducer in the case of a receiver, or an electrical-to-optical in the case of an emitter (or transmitter).

It is often important that the beam of light emitted or received (as applicable) by the transducer has an aperture angle below a suitable threshold in order to avoid or mitigate problems caused by stray light.

In the present description and in the attached claims, term "light" is used in a broad meaning to encompass not only electromagnetic radiation in the visible spectrum, rather also electromagnetic radiation of such wavelengths as to be handled with optical techniques usable for the visible spectrum, thus including the UV and IR regions also. Term "optical" is used in a similarly broad meaning.

For a reliable operation (e.g. to ensure that the received light is not unduly higher than a triggering threshold, thus causing an undesired or false triggering), indeed, the receiver should often only detect light directly coming along an intended path which includes, at least near the device, its optical axis, while light coming from other paths is stray light which detection should be suppressed or at least minimized.

In the present description and in the attached claims, expression "optical is" is used to indicate the beam centerline, or a line along which there is some degree of rotational symmetry of the beam, immediately outside of the optoelectronic device.

As far as the emitter is concerned, it is often desirable that only the main lobe of the output radiation characteristic, having a small radiative angle (as measured with respect to the optical axis), propagates, while the radiation having a radiative angle greater than a design angle, as well as secondary lobes of radiation, do not. This is particularly important for short distance detection.

The above is especially true when an optoelectronic emitter is paired with an optoelectronic receiver. Photocells, that comprise such a pair of transducers, are widely used, e.g. to control operation of an electric or electromechanical apparatus depending on whether an intended light path from emitter to receiver is interrupted or no. Light barriers that comprise a plurality of aligned pairs of transducers, a light curtain being formed of parallel beams propagating between paired transducers, may be used for safety reasons (also termed "safety light barriers" or "light curtains"), e.g. to set the bounds of a safety area by the light curtain, and generate an alarm, or stop the operation of a dangerous machine when a person or a part of human body interrupts the light curtain. Another field of application is that of measurement of the size of objects depending on the number of interrupted beams of the light curtain. These apparatuses need to have a sharp contrast between lit and unlit areas, and often need to work over a large span of distances.

In those cases, it is important that the or each receiver just detects the light directly coming from the paired emitter, along the intended light path. In order to avoid detection of the light coming from adjacent, non-paired emitters in a barrier, what could cause "crosstalk", the paired transducers are usually activated in sequence over time.

Stray light reaching the receiver may however also come from other light sources, or may be ambient light. Furthermore, if the aperture angle of an emitter is too large, the outer rays of the emitted light beam may be reflected and/or diffused by a surface arranged near the intended optical path. It may therefore undesirably happen that the paired receiver detects light even if the intended optical path is obstructed. In order to avoid the above drawbacks and/or comply with safety requirements, optoelectronic transducers are usually used together with optical tubes.

In the present description and in the attached claims, expression "optical tube" is used to indicate a cavity that routes light. In particular, light should be routed so as to allow propagation of light forming angles smaller than a threshold angle with the optical axis (sometimes referred to as "effective aperture angle") and attenuate or suppress stray light that would form angles larger than the threshold with the optical axis, the angles being considered outside the optoelectronic device and with due consideration of the effect of a possible lens at either end of the optical tube. It is noted that within the optical tube, light rays may form in principle any angle with the optical axis.

Optical tubes having a conical or cylindrical shape are known, but they are quite space consuming, what may jeopardize the possibility of mounting the optical device or apparatus at an intended location or on an intended object.

A large optical tube also lowers the packing factor of optoelectronic transducers in light barriers, and thus the resolution thereof. The resolution of a safety light barrier is a measure of the smallest item that will always interfere with at least one light beam, or, in more restrictive terms, that will always completely interrupt at least one light beam, and is closely related to the inter-axes distance or pitch of adjacent beams.

U.S. Pat. No. 5,748,816 discloses an optical tube for coupling with optical transmitter or receiver elements for transmitting or receiving radiation directed parallel to an optical axis and having means for suppressing interfering radiation substantially non parallel to the optical axis, wherein the means for suppressing interfering radiation consists of multiply reflecting surfaces which absorb interfering radiation and which are formed by a plurality of ribs which respectively extend substantially along a plane extending through the optical axis of the tube. The optical tube comprises an optical cavity formed symmetrically about the optical axis, the optical cavity defining an open end for receiving radiation and a closed end, a transmitter or receiver element on the optical axis mounted to the closed end of the optical cavity. The open end, and the section along planes taken normal to the optical axis, may be circular, square, oval or elliptical. The cavity may be cylindrical, may have a paraboloid surface, or may be a truncated cone. The free internal crosssectional area may continuously reduce in the direction towards the transmitter and/or receiver elements arranged at the base of the tube. Specifically, according to the document, the intersection line of the interior surface of the tube may be paraboloid-shaped or any other curve-like line, provided that no undercuts are formed. For the formation of the absorbing and multiply reflecting surfaces necessary for the suppression of the interfering radiation, an absorbing and multiply reflecting coating is applied to the ribs and is in particular formed by spraying on a mat black paint.

The Applicant observes that the formation of the ribs poses several practical limitations and difficulties, and the resulting chamber is subject to accumulation of dirt that may impair the use of the optical device.

DE202011000876U1 discloses an optical module for a light grid, the optical module comprising a multiple lens with at least two lenses arranged linearly in a longitudinal direction, which are connected to each other by at least one intermediate area, a tube body with at least two tubes arranged linearly in the longitudinal direction, and a lens carrier with first diaphragm openings. The tubes have a second diaphragm opening at an end arranged opposite the lens. The tube body, multiple lens and lens carrier can be plugged together so that the multiple lens is held between the tube body and the lens carrier, so that at least two optical tube channels are formed, each comprising a first aperture, a lens, a tube, and a second aperture. The tubes may be conical, which shape is considered by that document particularly suitable for selectively allowing only vertically incident light from the opposite transmitter of an optical channel to reach the light receiver. In a less space-consuming embodiment, the tubes may have oblique side walls transverse to the longitudinal direction forming a sort of triangular or rounded cross section, and steeper or substantially vertical side walls in the longitudinal direction. Alternatively, side walls are completely omitted in the longitudinal direction so that the light is not reflected in an uncontrolled manner on a steep side wall.

The Applicant observes that the manufacture in three pieces, actually four including an outer casing that keeps the three pieces together, requires several manufacturing steps besides a lengthy assembling step. Furthermore, as said the conical shape of the optical tube is quite space consuming.

JP3862741B2, on which the preamble of claim 1 is based, discloses a multiple optical axis photoelectric sensor. Each optical element, that is, a light projecting element or a light receiving element, is fitted at the base end of an element holder portion. Each element holder portion has a cylindrical passage formed therein, and the optical element faces the cylindrical passage through a first small circular opening. At the front end of the element holder portion, a lens is disposed. The cylindrical passage is provided with an integrally molded light shielding wall, and a second relatively large circular opening is formed in the central portion of the light shielding wall. The inner wall of the cylindrical passage of the element holder portion is preferably coated with a black paint. Instead of being cylindrical, the passage may have a circular cross-sectional shape that tapers/reduces toward the lens or that widens/increases toward the lens.

According to the document, the effects of the light shielding wall are that the amount of light that has been regularly reflected by the wall of the internal passage of the element holder portion is attenuated, while it is assumed that the light diffusely reflected by the wall of the internal passage is attenuated, so that there is no influence even if it goes outside. That is, the function of the light shielding wall of the internal passage is to prevent light that has been regularly reflected once by the wall of the internal passage from reaching the lens in the case of a projector, for example.

The Applicant observes that an internal passage having the shapes mentioned in this document needs to be quite large in the direction orthogonal to the optical axis in order to meet the intended goal, and that therefore the allowable resolution of the multiple optical axis photoelectric sensor is quite low. Alternatively, the passage should be very long, posing installation problems.

SUMMARY

The technical problem at the basis of the invention is that of providing an improved optical tube for an optoelectronic device. In particular, the optical tube should be efficient in stray light suppression, and/or should have small size in the axial direction and/or in the orthogonal direction thereto, and/or should be easily manufactured.

An optoelectronic device is disclosed, comprising:
an electrical-to-optical or optical-to-electrical transducer,
an optical tube assembly, an optical tube being formed in the optical tube assembly, the optical tube comprising an optical chamber, the optical chamber including a chamber wall, a first aperture in the chamber wall proximal with respect to the transducer, and a second aperture in the chamber wall distal with respect to the transducer, the two apertures being at least approximately coaxial along an optical axis and at a distance along the optical axis,
characterized in that in at least one first half-section taken along optical axis or along a direction parallel to optical axis:
at least an intermediate portion of the chamber wall, extending between (i) a first line orthogonal to optical axis and more distal than or including a boundary point of the first aperture and (ii) a second line orthogonal to optical axis and more proximal than a boundary point of the second aperture, follows a non-straight curve, wherein the local tangent to intermediate portion at each point is oriented so that any stray light ray incoming from the boundary point of the first aperture in the opposite half-section would be so deviated at that point as to impinge upon the chamber wall, an impingement point of said stray light ray being in said first half-section and more distal than said second line.

Those skilled in the art will understand that a stray light ray propagating in the opposite direction would follow the same path from said impingement point to the point at which the local tangent is considered, to the boundary point of the first aperture in the opposite half-section.

In the present description and attached claims, under "at least approximately coaxial" it is meant that a center or point along which there is some degree of rotational symmetry of one aperture is at a distance smaller than 1 mm, and preferably 0.5 mm of an axis or line along which there is some degree of rotational symmetry of the other aperture.

The opposite half-section is the other half-section lying in a same section plane as that containing the first half-section.

In the present description and in the attached claims, any use of terms "distal" and "proximal" is made with reference to the transducer.

The above shape of the optical chamber is very efficient in stray light suppression with a minimum size in a direction orthogonal to optical axis and/or in the axial direction. The high stray light suppression allows working range for optical sensors like light curtains to be improved, and also allows more space to add secondary features, such as an indication interface, laser alignment, etc.

Furthermore, it allows, at least in some embodiments, manufacture through a single molding step.

Preferably, said impingement point(s) is(are) in the neighborhood of the boundary point of the second aperture in said first half-section.

Term "neighborhood" is meant to indicate at a small distance in a direction orthogonal to the optical axis, e.g. smaller than or equal to 4 mm, preferably smaller than or equal to 3 mm, more preferably smaller than or equal to 2 mm.

More preferably, all impingement points, as said each point at which the local tangent is considered varies, are concentrated in a spot smaller than or equal to the size of the region spanned by said each point, even more preferably are concentrated essentially in a single impingement point.

The feature that impingement point(s) are on the chamber wall in the first half-section, as well as preferably also the other preferred features for the impingement point(s) indicated above, advantageously also hold true by construction for stray light rays incoming from within the entire first aperture in said first half-section.

In any case, the local tangent to intermediate portion at each point may be oriented so that a stray light ray incoming from within the entire first aperture would be so deviated at that point as to impinge upon the chamber wall, in said first half-section.

More specifically, the local tangent to intermediate portion at each point may be oriented so that a straight line departing from that point at an angle with the local tangent, which is equal to the angle between the local tangent and a straight line extending between that point and the boundary point of the first aperture in the opposite half-section, and on the other side with respect to the normal to that point, crosses the first half-section, at an impingement point of chamber wall more distal than said second line.

The non-straight curve preferably is or approximates a conical curve with conic constant comprised in the range of higher than or equal to −1 and lower than 0.

Preferably, the curve axis(axes) lie(s) in a same plane as said first half-section.

Approximation of a given geometrical curve is to be understood as meaning that the maximum distance of the approximated curve and the given geometrical curve, as measured along a direction orthogonal to the optical axis, is less than or equal to 3 mm, preferably less than or equal to 2 mm, more preferably less than or equal to 1 mm and/or less than or equal to 20% of the resolution, preferably less than or equal to 13% of the resolution, more preferably less than or equal to 7% of the resolution in the case of an optical device part of a light barrier.

Another (additional or alternative) criterium of approximation may be that the local tangent to the approximated curve is within ±15°, preferably within ±8°, most preferably within ±5° of the local tangent to the given geometrical curve.

A given geometrical curve, or a portion thereof, may e.g. be approximated by a piecewise-linear curve.

When the conic constant differs from −1, a major axis of the conical curve may cross the chamber wall both in said first half-section, possibly at the boundary point of the second aperture, and in the opposite half-section, possibly at the boundary point of the first aperture. The major axis will thus not pass through any of the two apertures. Instead, in the case of conic constant equal to −1, the axis more conveniently passes through at least one of the apertures.

The non-straight curve may at least approximately follow a portion of an ellipse, wherein:

a first focus of ellipse is at or farther from optical axis than the boundary point of first aperture in the opposite half-section, a second focus of ellipse is at or farther from optical axis than boundary point of second aperture in said first half-section.

Either focus may lie on the chamber wall, within the optical chamber, or outside of the optical chamber.

Preferably, second focus is more distal than or at the second line.

More preferably, second focus is in the neighborhood of the boundary point of the second aperture in said first half-section.

Even more preferably, second focus is at a distance from boundary point of second aperture in said first half-section that is smaller than or equal to 27% of the resolution, in the case of an optical device part of a light barrier, preferably smaller than or equal to 20% of the resolution, even more preferably smaller than or equal to 13% of the resolution and/or smaller than or equal to 4 mm, preferably smaller than or equal to 3 mm, even more preferably smaller than or equal to 2 mm. The distance is preferably measured along a direction orthogonal to the optical axis.

First focus is preferably at a distance from boundary of first aperture in the opposite half-section smaller than or equal to 27% of the resolution, in the case of an optical device part of a light barrier, preferably smaller than or equal to 20% of the resolution, even more preferably smaller than or equal to 13% of the resolution and/or smaller than or equal to 4 mm, preferably smaller than or equal to 3 mm, even more preferably smaller than or equal to 2 mm. The distance is preferably measured along a direction orthogonal to the optical axis.

Additionally or alternatively to any of the above features, considering a reference ellipse having the first focus at the boundary point of first aperture in the opposite half-section, the second focus at the boundary point of second aperture in said first half-section, and passing from the boundary of first aperture in said first half-section, the maximum distance of non-straight curve and the closest portion of reference ellipse, as measured along a direction orthogonal to the optical axis, is less than or equal to 4 mm, preferably less than or equal to 3 mm, and/or less than or equal to 27% of the resolution, preferably less than or equal to 20% of the resolution in the case of an optical device part of a light barrier.

In any of the above cases, in said at least one first half-section, chamber wall may follow, for a portion more distal than said second line, a straight line which is parallel to or skewed towards optical axis when looking in the direction from proximal to distal. The angle between straight line and optical axis is preferably included in the range 0-60°, preferably in the range 0-45°, more preferably in the range 0-30°.

In any of the above cases, in said at least one first half-section, chamber wall may follow, for a portion more proximal than said first line, a straight line which is parallel to or skewed towards optical axis when looking in the direction from distal to proximal. The angle between straight line and optical axis is preferably included in the range 30-90°, preferably in the range 45-90°.

In any of the above cases, chamber wall may include a distalmost wall portion forming an undercut region of optical chamber, when looking towards the first aperture along the direction of optical axis, the second aperture being formed in such a distalmost wall portion. It shall be noted that when the above discussed more distal portion following a straight line is skewed towards optical axis, it may also embody, at least in part, distalmost wall portion. Distalmost wall portion is preferably selected from a flat distal wall portion orthogonal to optical axis, a roof-shaped distal wall portion, and a curved distal wall portion.

Curved distalmost wall portion may follow, in said at least one first halfsection, part of a same curve as that followed by intermediate portion (64).

Non-straight curve may also at least approximately follow a portion of a parabola, wherein:

the distance between the focus and the vertex is less than or equal to twice the size of the first aperture in the first half-section and/or less than or equal to 20% of the resolution, in the case of an optical device part of a light barrier, and the focus is as distal as, or more distal than the boundary point of the first aperture in said first half-section, and the vertex is as proximal as, or more proximal than, the boundary point of the first aperture in said first half-section, or on the other side of the transducer and the parabola axis passes within at least one of the first aperture (58) and the second aperture.

In such a case, there will generally be a distalmost wall portion as discussed. In any of the above cases, chamber wall may comprise at least one straylight-exit opening or cutout.

In any of the above cases, chamber wall may be a solid of revolution, nonstraight curve being at least part of the generatrix.

Alternatively, chamber wall may be a solid having non-straight curve as at least part of the generatrix, translated preferably perpendicularly to optical axis, more preferably in widthwise direction in the case of an optical device part of a light barrier.

Preferably, optical tube assembly is in this case formed in one piece by injection molding with side slide.

Second aperture may be oval shaped or barrel-shaped.

In any of the above cases, chamber wall preferably has a reflective finish, preferably a smooth specularly reflective finish, and more preferably is made of black glossy plastic. It is thereby ensured that radiation diffused by the chamber wall has very low levels. Preferably the surface roughness is Ra≤0.63 μm, more preferably Ra≤0.4 μm.

In any of the above cases, optical tube may further include a second optical chamber distal to said optical chamber.

The second optical chamber includes said second aperture and optionally a third aperture at least approximately coaxial with and more distal than the second aperture. As an alternative to a third aperture, the second optical chamber may include an opening that does not affect the beam size.

The second optical chamber is preferably cylindrical or conical.

The device may further include a converging lens at a distal end of optical tube.

The first aperture is preferably at a focal plane of the lens.

The lens may be oval shaped or barrel-shaped.

Preferably, second aperture has the same shape of the lens, suitably scaled.

When there is a second optical chamber, a third aperture may be formed on a distal side of the lens, preferably onto the distal face of the lens.

The inner wall of the optical chamber is free from ribs or other multiply reflecting surfaces.

A photocell is also disclosed, comprising an emitter optoelectronic device and a paired receiver optoelectronic device, at least one of the emitter optoelectronic device and receiver optoelectronic device being as discussed above.

An optoelectronic barrier is also disclosed comprising a plurality of paired emitter and receiver optoelectronic devices, at least one of the emitter optoelectronic devices or of the receiver optoelectronic devices being as discussed above.

There is also disclosed an optical tube comprising an optical chamber, the optical chamber including a chamber wall, a first aperture in the chamber wall proximal with respect to a seat for an electrical-to-optical or optical-to-electrical transducer, and a second aperture in the chamber wall distal with respect to the seat, the two apertures being at least approximately coaxial along an optical axis, and at a distance along the optical axis, characterized in that in at least one first half-section taken along optical axis or along a direction parallel to optical axis:

at least an intermediate portion of the chamber wall, extending between (i) a first line orthogonal to optical axis and more distal than or including a boundary point of the first aperture and (ii) a second line orthogonal to optical axis and more proximal than a boundary point of the second aperture, follows a non-straight curve, wherein the local tangent to intermediate portion at each point is oriented so that a stray light ray incoming from the boundary point of the first aperture in the opposite half-section would be so deviated at that point as to impinge upon the chamber wall, an impingement point of said stray light ray being in said first half-section and more distal than said second line.

Preferred features of the optical tube are as disclosed above for the optical tube of the optical device.

BRIEF DESCRIPTION OF THE DRAWINGS

Further features and advantages of the present invention will be more clearly apparent from the following detailed disclosure of some embodiments thereof, made with reference to the attached drawings, wherein.

DETAILED DESCRIPTION OF THE DRAWINGS

Embodiments of the optical tube and optoelectronic devices of the invention are shown and described by way of non-limiting examples.

In the present description and in the attached claims, some terms are meant to be understood as follows.

An optoelectronic device comprises at least one transducer being an optical-to-electrical (OTE) transducer in the case of a receiver, or an electrical-to-optical (ETO) transducer in the case of an emitter (or transmitter).

A photocell comprises an ETO transducer and an OTE transducer optically paired so that light emitted by the ETO transducer is detected by the OTE transducer.

An emitter, respectively receiver optoelectronic barrier comprises a plurality of ETO, respectively OTE transducers having parallel optical axes, and aligned along a direction orthogonal to the optical axes, or lengthwise direction.

An optoelectronic barrier comprises an emitter optoelectronic barrier and a receiver optoelectronic barrier optically paired so that light emitted by each ETO transducer is detected by a respective paired OTE transducer.

Furthermore, there are optoelectronic devices wherein at least one ETO and OTE transducer pair are arranged side by side, the optical path being folded back from the ETO transducer to the OTE transducer by a suitable mirror or other optical means such as a prism.

There are also heterogeneous optoelectronic barriers comprising both ETO and OTE transducers aligned along one direction, which are properly paired to ETO and OTE transducers of a mating heterogeneous barrier.

Term optoelectronic will be often omitted hereinafter for the sake of brevity.

In all the above instances, the optical pairing generally includes alignment along an intended optical path. The optical path may be straight and be termed an optical axis, or it may include bends or folds, such as caused by one or more mirrors along the optical path. The case of straight optical path will be referred to hereinbelow.

Figure 1:
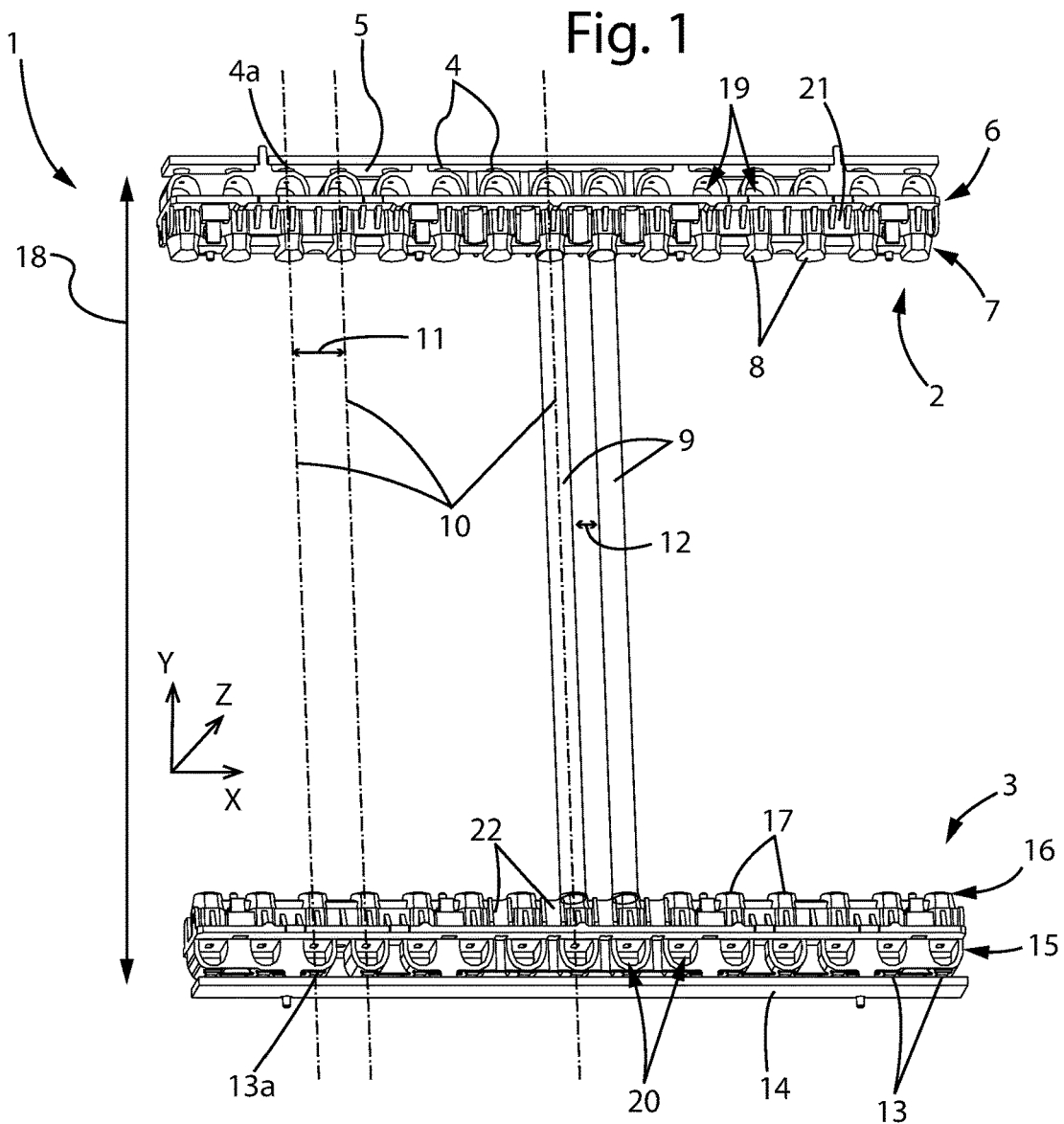
FIG. 1 diagrammatically shows an optoelectronic barrier, an emitter optoelectronic barrier, and a receiver optoelectronic barrier, FIG. 2 diagrammatically shows a photoelectric cell, an emitter optoelectronic device, and a receiver optoelectronic device, FIGS. 3 and 4 diagrammatically show two different perspective views of an exemplary optoelectronic device, FIG. 5 diagrammatically shows a perspective sectional view extending through the optical axis of the exemplary optoelectronic device, FIG. 6 diagrammatically shows a perspective sectional view extending through the optical axis of the exemplary optoelectronic device, in another configuration, FIG. 7 diagrammatically shows a perspective sectional view extending through the optical axis of another exemplary optoelectronic device, FIG. 8 diagrammatically shows a cross-section extending through the optical axis of another exemplary optoelectronic device, FIGS. 9-12 diagrammatically show other optical chambers, FIG. 13 diagrammatically show a section through an optoelectronic device, and FIG. 14 diagrammatically show a section through an optoelectronic device according to a comparative example.

FIG. 1 shows an optoelectronic barrier 1, an emitter optoelectronic barrier 2 and a receiver optoelectronic barrier 3.

Emitter optoelectronic barrier 2 comprises a plurality of ETO transducers 4, preferably borne by a single Printed Circuit Board or PCB 5, and an optical component 6 or optical tube assembly 6. The PCB 5 may further bear e.g. a power supply circuit, one or more control circuits, a communication circuit etc.

A beam shaper assembly 7 is further shown, though not necessarily included. Beam shaper assembly 7 comprises a plurality of focusing converging lenses 8 or other types of beam shapers (lenses will be referred to hereinafter for the sake of brevity), each lens 8 being associated with a corresponding ETO transducer 4 to shape its emitted beam 9 (just a few beams being diagrammatically shown). ETO transducers 4 are arranged at a preset distance from the respective lens 8; either ETO transducers 4 or associated apertures (see below) may preferably be arranged at a focus of the respective lens 8.

ETO transducers 4 are aligned along a lengthwise direction X orthogonal to the respective optical axes 10.

ETO transducers 4 are preferably equally spaced at an inter-axis distance or pitch 11.

The optical axes 10 (just a few axes being exemplarily shown) of the ETO transducers 4, as well as of their respective lenses 8, are thus parallel to each other, there being a gap 12 between immediately adjacent beams 9 for the reasons discussed below.

In the present description and attached claims, under "immediately adjacent" elements, without intervening ones is meant.

Similarly, receiver optoelectronic barrier 3 comprises a plurality of OTE transducers 13 preferably borne by a single Printed Circuit Board or PCB 14, an optical component or optical tube assembly 15, and possibly a beam shaper assembly 16 comprising a plurality of focusing converging lenses 17 or other types of beam shapers, each lens 17 being associated with a corresponding OTE transducers 13 to focus the received beam 9 onto the OTE transducer 13, which is arranged at a preset distance from the respective lens 17. Either OTE transducers 13 or associated apertures (see below) may preferably be arranged at a focus of the respective lens 17.

OTE transducers 13 are aligned along lengthwise direction X and are equally spaced at the same inter-axis distance or pitch 11 as ETO transducers 4 so as to receive parallel beams 9 spaced by gap 12.

The emitter and receiver barriers 2, 3 are mounted so that ETO transducers 4 and OTE transducers 13 are optically paired (see e.g. the transducers labeled as 4a and 13a), so that light emitted by an ETO transducer 4 is detected by a respective OTE transducer 13. In FIG. 1, optical pairing is obtained by transducers 4, 13 facing each other.

In other configurations, the two barriers 2, 3 may be differently arranged, there being beam deflector devices such as one or more mirrors or prisms in between. In such cases, the optical path from the emitter axes to the receiver axes need not be straight, but for the rest the present disclosure applies, so that the exemplary case of FIG. 1 will be referred to hereinafter for the sake of simplicity.

The distance 18 emitter-to-receiver, along the propagation direction Y, is exaggeratedly short in FIG. 1 for the purpose of illustration, and may range from e.g. 20 cm to e.g. 70 m. Light barriers 1 may be for example comprised of modules. Each module may be e.g. 15 cm long. Light barriers may be as short as 15 cm and as long as 3 m, though there is not an actual upper limit. Emitter and receiver barrier modules may alternate at each side of a light barrier. Furthermore, as discussed the modules themselves may include both ETO and OTE transducers, the present disclosure applying mutatis mutandis.

The parallel beams 9 form a light curtain. When an object, including a human body or body part, crosses the light curtain, at least one light beam 9 should be preferably completely blocked so that the associated OTE transducer 13 nominally stops receiving light from the paired ETO transducer 4, although in principle it is possible to detect a breach of the barrier even if a beam 9 is only partly blocked.

For measurer light barriers 1, the resolution should often be the smallest possible. For safety light barriers 1, the resolution should have a proper value. E.g. the resolution should be of at least 300 mm in the case of a body detector, of at least 30 mm in the case of a hand detector, and of at least 14 mm in the case of a finger detector.

When the light beams 9 have a circular cross section of a given smallest diameter, the resolution (computed so that at least one light beam 9 is completely blocked) corresponds to the beam diameter plus the pitch 11, and therefore worsens as the size of the gap 12 increases.

It is known to use oval or barrel-shaped lenses 8, 17 (the latter being shown in FIG. 1) so that in the near field (near the lenses), the size of the beam 9 in the lengthwise direction X is shorter than the size of the beam in a width direction Z that is orthogonal to both the propagation direction Y and the lengthwise direction X; this lens design increases the size of gap 12, however without affecting resolution. For the reasons explained in the introductory portion, each OTE transducer 13 should only detect the emitted beam 9 directly coming from the paired ETO transducer 4, i.e. light propagating over from an intended light path; and should not detect stray light, which might come from a non-optically paired ETO transducer 4 (in the event that the pairs are not activated sequentially over time), from other light sources, or can be ambient light, or may be represented by rays originated by the paired emitted beam 9 but which are detected after undesired reflection, diffusion or scattering at a nearby surface.

Accordingly, a constraint in safety barriers design is usually that the effective aperture angle, or maximum half-aperture of the cone of emitted, respectively received light beam 9 is lower than a threshold. For example, for a "type 4" safety light curtain, the threshold is 2.5° when the distance 18 emitter-to-receiver is greater than 3 m.

Detection of stray light might raise the output level of an OTE transducer 13 to above a detection threshold which is set to a design value based on the incoming light rays that satisfy that constraint. This may result in a signal falsely indicating an unblocked light beam 9 even in the presence of an object that should have been detected by the barrier 1.

To meet such constraint, each optical component 6, 15 comprises a plurality of optical tubes 19, 20 which have the function of allowing propagation of light rays forming angles smaller than a threshold angle with the optical axis, and of attenuating or suppressing stray light rays that would form angles larger than the threshold with the optical axis to the greater possible extent. As already stated, the angles to be compared with the threshold are those that the light rays assume or would assume outside the optoelectronic device, with due consideration of the effect of a possible lens at either end of the optical tube (including e.g. a lens integrated in an ETO transducer such as an LED), while within the optical tube, light rays of both categories may form in principle any angle with the optical axis.

At the partition wall 21, 22 between immediately adjacent optical tubes 19, 20 in the optical components 6, 15 of the emitter and receiver barriers 2, 3, passages for light guides for visual indicators, and/or holes for screws or other fastening means, and/or other auxiliary means may be accommodated. Partition wall 21, 22 also provides mechanical stability to the emitter and receiver barriers 2, 3.

To improve the resolution, as discussed it is important that each optical tube 19, 20 is as narrow as possible in the lengthwise direction X.

Furthermore, for mounting purposes it is also often desirable that each optical tube 19, 20 is as short as possible in the propagation direction Y or emitter-to-receiver direction Y. Last, it is also often desirable for mounting purposes that each optical tube 19, 20 is as narrow as possible in the width direction Z.

Figure 2:
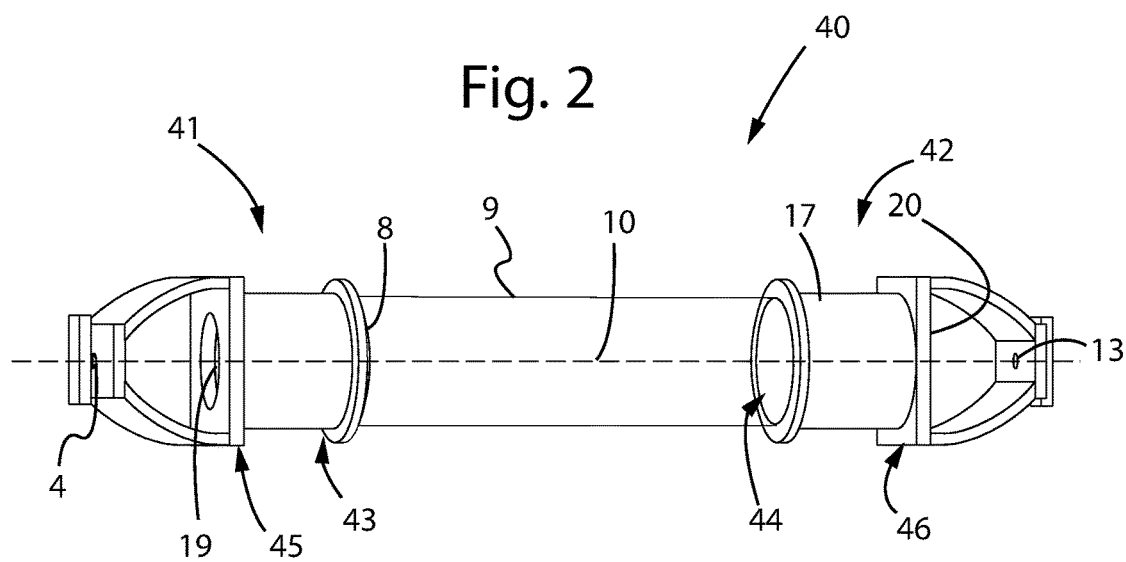

Similar considerations also apply to a photoelectric cell 40 wherein, as diagrammatically shown in FIG. 2, an emitter device 41 comprising a single ETO transducer 4 and a receiver device 42 comprising a single OTE transducer 13 are optically paired so that light emitted by the ETO transducer 4 is detected by the OTE transducer 13. Each of the emitter and receiving devices 41, 42 further comprises an optional beam shaper assembly 43, 44 comprising a single lens 8, 17 or other optical devices,; and an optical tube assembly 45, 46 comprising a single optical tube 19,20. It is noted that, although the same reference numbers are used for the sake of convenience, lenses 8, 17 in this case are preferably circular as shown.

Figure 5:
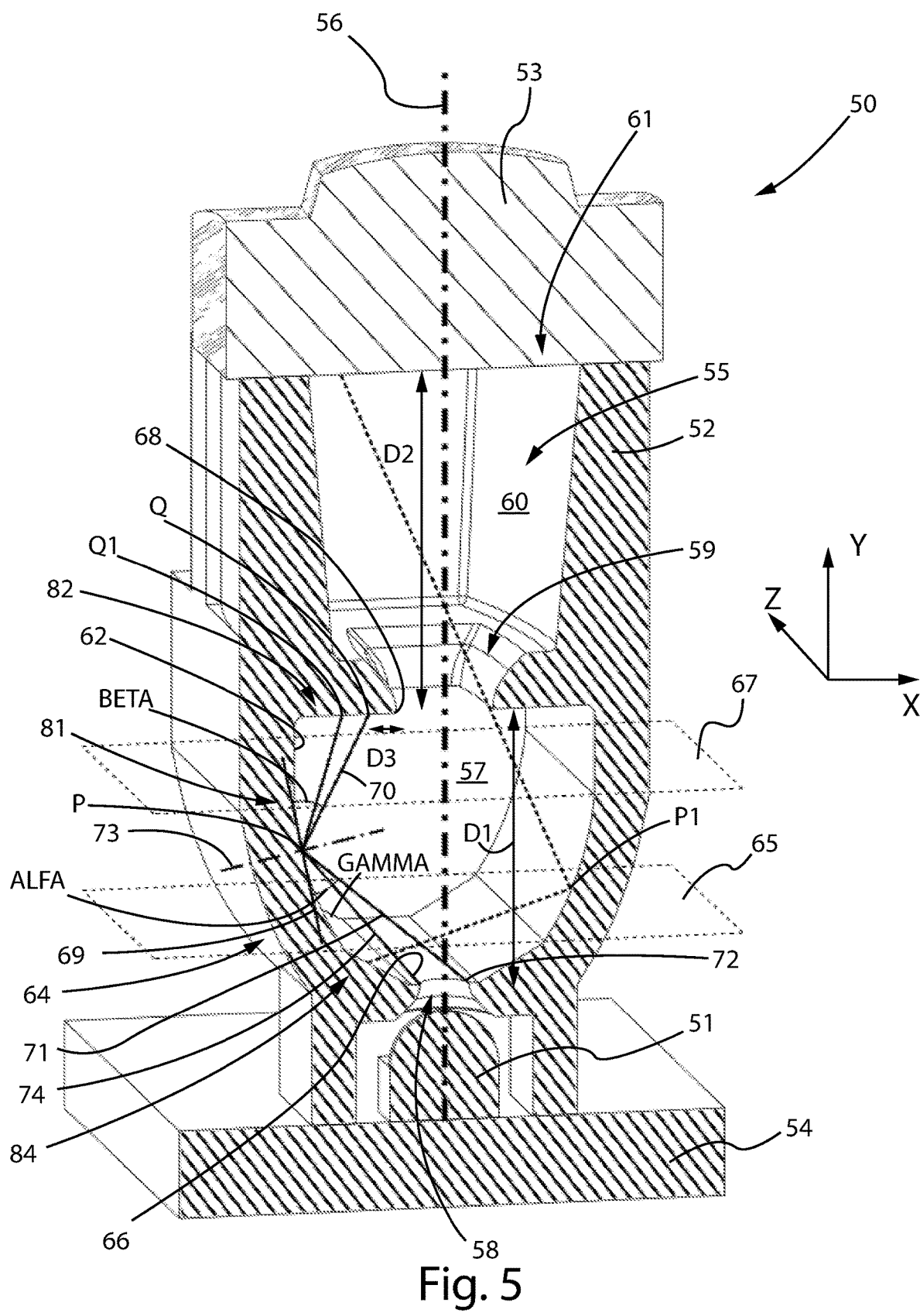

An exemplary optoelectronic device 50 is shown in FIGS. 3-5. The device shown is, just by way of a non-limiting example, one of the plurality of devices formed within the emitter optoelectronic barrier 2 of FIG. 1, but it is also representative of one of the plurality of devices formed within the receiver optoelectronic barrier 3 of FIG. 1, as well as of each device 41, 42 of photoelectric cell 40. Details specifically taken from FIG. 1 are not necessarily included in an optoelectronic device. It is thus understood that the following is a description of a general emitter optoelectronic device and also applies to a general receiver optoelectronic device, mutatis mutandis, unless otherwise indicated.

Optoelectronic device 50 comprises an ETO or OTE transducer 51, an optical tube assembly 52, and an optional lens 53 or another beam shaper. A support 54 for transducer 51 is also shown, which may represent PCB 5 or PCB 14, or another suitable support, including a surface at which the optoelectronic device 50 is installed (namely, support 54 may not form part of optoelectronic device 50).

An optical tube 55 is formed within optical tube assembly 52, and, as said above, has the function of allowing propagation, outside of the optoelectronic device 50, of light rays emitted or received by transducer 51 and extending parallel to optical axis 56 or forming a small angle therewith, not greater than a threshold, e.g. an angle not greater than 2.5°, as well as of suppressing or attenuating the other light rays to the greater possible extent.

Optical tube 55 extends from transducer 51 along the optical axis 56 or propagation direction Y for a length. Optical tube 55 comprises an optical chamber 57 comprising a first aperture 58 near transducer 51, also named proximal aperture 58 herein, and a second aperture 59.

Optical tube 54 may be comprised of optical chamber 57, however it preferably also comprises a second optical chamber 60, distal to said optical chamber 57, and which comprises second aperture 59 and a third aperture 61.

For this reason, second aperture 59 is also named median aperture 59 herein, and third aperture 61 is also named distal aperture 61 herein. However, it will be understood that in case second optical chamber 60 is missing (as shown e.g. in FIG. 13), then second aperture 59 forms the distal aperture of optoelectronic device 50.

When lens 53 is present, optical tube 55 may also be larger than the lens 53 at its lens-side end; in that case the distal aperture of the optical tube 55 may be replaced by an aperture at the either side of lens 53. Such aperture at the either side of lens 53 may be formed by a darkening treatment of the outer annulus of lens 53 itself. Second optical chamber 60 will include an opening that does not affect the beam size, and thus is not named aperture herein.

First, second and third apertures 58, 59, 61 are at least approximately coaxial along optical axis 56. Second aperture 59 is at a distance D1 from first aperture 58 and at a distance D2 from third aperture 61 (or opening). Optical chamber 57 and second optical chamber 60 extend over a length D1, respectively D2 along optical axis 56.

First aperture 58 is the smallest one, second aperture 59 is preferably as large as or larger than first aperture 58 and preferably smaller than third aperture 61, if present. For example, first aperture 58 may have a diameter of about 1 mm for an optoelectronic device 50 part of a light barrier.

First aperture 58 is the main aperture of optoelectronic device 50. Its diameter should be properly selected based on the size of transducer 51 and/or on the desired aperture angle of the light beam 9 and/or on the focal length of the lens 53, if present.

Second aperture 59, and third aperture 61 if present, have a size selected, i.a., based on the desired size of the cross-section of the light beam 9 at the output of optoelectronic device 50.

The distal aperture (be it either second aperture 59, third aperture 61 or an aperture at the lens 53) sets the nominal or design cross section of the light beam entering/exiting the optical tube 55.

In the case of an optoelectronic device 50 part of a light barrier, second aperture 59 (as shown) and/or third aperture 61 may be oval or barrelshaped as discussed above in respect of lens 53, so that in the near field (in proximity of the distal side of optoelectronic device 50) the size of the beam in the lengthwise direction X is shorter than the size of the beam in a width direction Z that is orthogonal to both the propagation direction Y and the lengthwise direction X. In the far field, beam 9 will have a circular crosssection as it will be the image of the first aperture 58.

The size of the distal aperture is also related to the size or acceptance area of lens 53 or beam shaper, as understood by a person skilled in the art. Thus, the overall length D1+D2 of optical tube 55 and the size of the distal aperture 61 (or the aperture at the lens) are related to each other and depend on the desired aperture angle and on the characteristics of the lens 53, if present. However, where to position second aperture 59 along optical axis 56 is a degree of freedom in design. In case second optical chamber 60 is absent, distance D1 and the size of the distal, second aperture 59 are related to each other and depend on the desired cross section of the light beam entering/exiting the optical tube 55 and on the characteristics of the lens 53, if present.

Chamber wall 62, in which apertures 58, 59 are formed, has the following "outline" or "profile" in at least one half-section taken along optical axis 56 (e.g., the left-side of the cross-section shown in FIG. 5) or along a direction parallel to optical axis 56, the half-section being sometimes referred to as first half-section herein. Below, reference to the opposite half-section is understood as being the other half-section (e.g., the right-side of the crosssection shown in FIG. 5) lying in a same section plane as that containing the first half-section.

At least an intermediate portion 64 of chamber wall 62 follows a non-straight curve.

Intermediate portion 64 of chamber wall 62 extends between:
a first plane 65, defining a first line in the half-section which is also referenced as first line 65, which is orthogonal to optical axis 56, and lies at the first aperture 58 or (as shown in FIG. 5) distally thereto, i.e. which is more distal than or includes a boundary point 66 of the first aperture 58 (in the first half-section), wherein a boundary point is the intersection of one aperture of chamber wall with the half-section plane being considered,
a second plane 67 defining a second line in the half-section which is also referenced as second line 67, which is orthogonal to optical axis 56, and lies more proximally than the second aperture 59, i.e. which does not include a boundary point 68 of the second aperture 59 (in the first half-section).

The two distances of the planes 65, 67 from the ends (in axial direction) of optical chamber 57 are, thus, not necessarily identical. Intermediate portion 64 may extend to one of or both the axial ends of chamber 57, although it does not include the plane in which second aperture 59 extends.

In the present description and the attached claims, "intermediate portion" is, accordingly, not limited to a portion lying at a same distance from two extremes. Thus, the property below may just hold true for less than the entire distance D1, and need not hold true immediately adjacent to first aperture 58 or immediately adjacent to second aperture 59.

The local tangent 69 to intermediate portion 64 of chamber wall 62 at each point P is oriented so that a straight line 70 departing from that point P at an angle BETA with the local tangent 69, which is equal to the angle ALFA between the local tangent 69 and a straight line 71 extending between that point P and the boundary point 72 of the first aperture 58 in the opposite half-section, and on the other side with respect to the normal 73 to chamber wall 62 at that point P, crosses the half-section, at an impingement point Q of the chamber wall 62.

Impingement point Q is in the first half-section, and is more distal than second line 67. Thus, impingement point Q lies on the continuation of the chamber wall 62 distally of the intermediate portion 64 thereof, and notably it lies outside the second aperture 59.

More in general, the local tangent 69 to intermediate portion 64 at each point P is oriented so that a stray light ray incoming from within the entire first aperture 58 and reflected at intermediate portion 64 will impinge twice upon the chamber wall 62, in said half-section (at points P and Q).

This may be easily obtained when the local tangent 69 to the intermediate portion 64 at each point P is oriented so that a stray light ray incoming from the boundary point 72 of the first aperture 58 in the opposite half-section, is so deviated at that point P as to impinge upon the chamber wall 62, at impingement point Q located as stated above: stray light rays incoming from within the first aperture 58 and reflected at point P will impinge upon the chamber wall 62, specifically at a point further from second aperture 59 and from optical axis 56 than point Q.

In FIG. 5, the path of a stray light ray 74 incoming at point P from the boundary point 66 of the first aperture 58 in the first half-section—and forming angle GAMMA with the local tangent 69—is shown to impinge at point Q1 after reflection at P. The impingement point of all stray light rays incoming at P from within the first aperture 58 will lie between points Q and Q1.

Accordingly, such stray light will be reflected at least twice within optical chamber 57, and, because at each reflection the light ray intensity is attenuated, stray light will be suppressed to a convenient level, if not completely. Furthermore, by properly orienting the tangent of the portion of chamber wall 62 distal from second line 67, those stray light rays may also be caused to impinge a third time within optical chamber 57, further improving the performance of the optical tube 55.

Those skilled in the art will understand that a stray light ray propagating in the opposite direction would follow the same path from said impingement point Q, to the point P at which the local tangent 69 is considered, to the boundary point 72 of the first aperture 58 in the opposite half-section.

Thus, in case of OTE transducer 51, a stray light ray might only reach within first aperture 58 along line 71, line 74 or a line included therebetween if it has already been reflected at least twice: once at Q, Q1 or a point between Q and Q1, and thereafter at P; it would thus have been highly attenuated. Moreover, a light ray incoming from within the second aperture 59 and impinging on point P will form a greater angle than angle BETA, and therefore will impinge upon the chamber wall 62 on the opposite half-section, without reaching through first aperture 58. For the sake of convenience of illustration, such an exemplary light ray has been shown in FIG. 5 for a point P1 taken in the opposite half-section, under the assumption in this context that the cross-section is symmetric and the right-hand side of the figure has the same properties as those described in detail for the left-hand side—what is however not mandatory.

It will be understood that, for any given point P, by changing the orientation of the local tangent 69 within a range, the actual position of impingement point Q can be changed, still meeting the above indicated properties thereof. This provides a certain degree of freedom of design of optical chamber 57.

Impingement point Q is preferably caused to be in the neighborhood of the boundary point 68 of second aperture 59 in the same half-section as point P, namely in the first half-section. This aids in keeping the size of the optical chamber, in a direction X orthogonal to the optical axis 56 and lying in the section plane being considered, small. Although setting impingement point Q at boundary point 68 of second aperture 59 in the first half-section would minimize that size of the optical chamber along direction X, it is preferable to consider a safety margin to account for manufacture tolerance of the second aperture 59. The safety margin is preferably comprised between 0.1 mm and 2 mm, more preferably comprised between 0.1 mm and 1 mm, even more preferably it is of 0.3 mm. This is deemed to be acceptable when the accuracy of manufacturing of the second aperture 59 is ±0.2 mm.

The distance D3 from impingement point Q to the boundary 68 of second aperture 59 in the first half-section is preferably comprised in a range which lower limit is said safety margin. The upper limit of the range may be e.g. of about 4 mm, preferably 3 mm, even more preferably 2 mm. In the case of an optical device 50 part of a light barrier, then the upper limit of the range may (additionally or alternatively) be set as 27% of the resolution, preferably 20% of the resolution, even more preferably 13% of the resolution.

In the case of a light barrier or grid having a resolution of 14 mm, suitable for detecting down to a human finger, the distance D3 is preferably smaller than or equal to 3.8 mm. For other resolutions, where space savings is less critical, distance D3 may be larger than that.

The distance from boundary point 68 of second aperture 59 in the first half-section of impingement point Q1 corresponding to the boundary point 66 of first aperture 58 in the first half-section will be larger than D3.

Furthermore, as it will be understood and as also shown in later described FIG. 13, as the considered point P moves along intermediate portion 64, impingement point Q associated thereto will in general change. This also provides a certain degree of freedom of design of optical chamber 57.

Preferably all impingement points Q as the considered point P varies along the intermediate portion 64 are caused to be concentrated, so as to lie in a spot which is smaller than or equal to the size of the region spanned by point P. As discussed later with reference to FIG. 6, all impingement points Q may also be concentrated essentially in a single impingement point.

Similarly, as the considered point P moves along intermediate portion 64, impingement point Q1 associated thereto will in general change and will preferably concentrate in a spot.

Accordingly, all light rays incoming from within the boundary 66 of the first aperture 58 are so deviated within optical chamber 57 as to concentrate in a spot (in general larger than the spot relating just to the points Q) that extends preferably at safety distance from the boundary 68 of second aperture 59.

Figure 6:
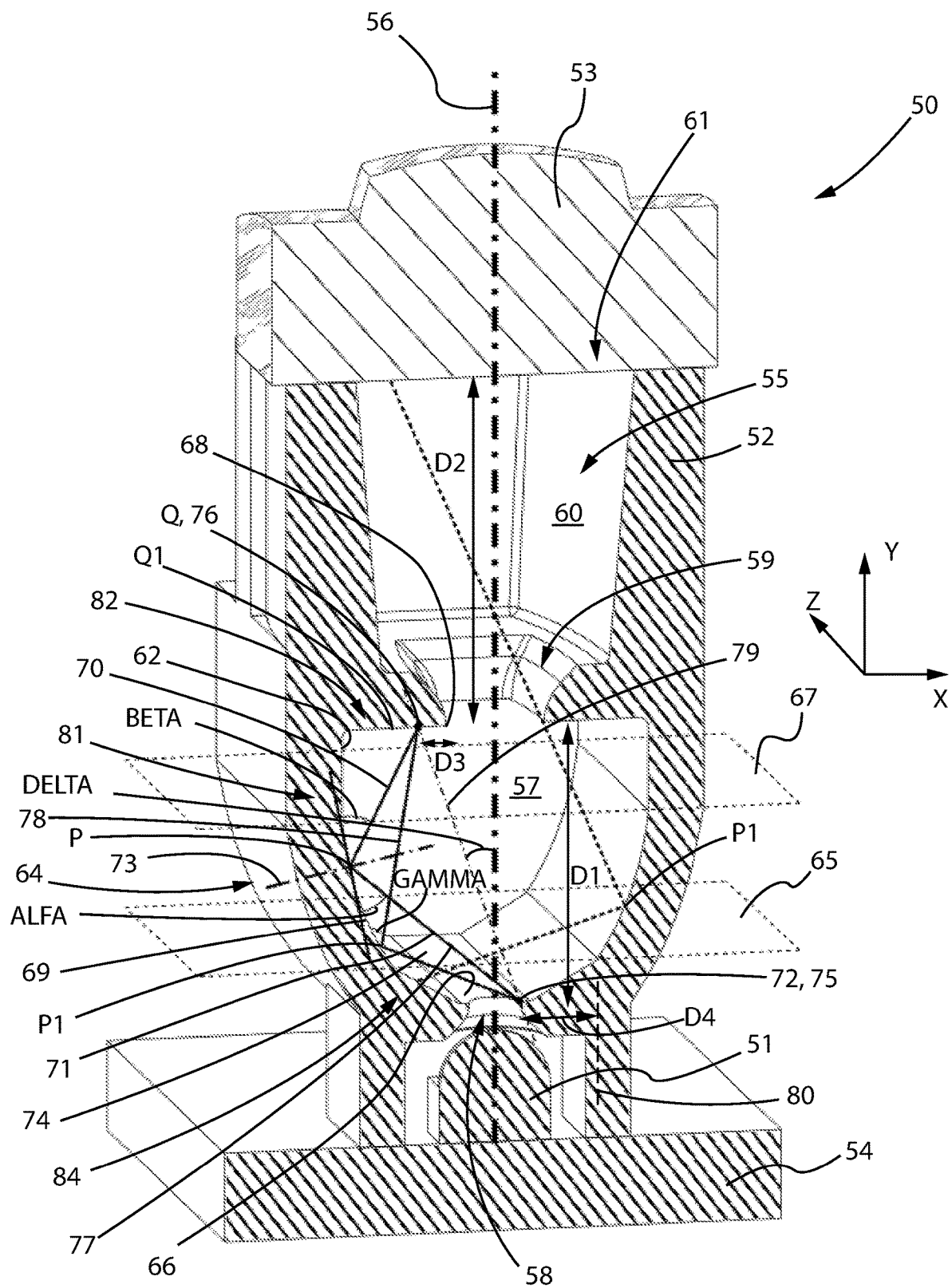

FIG. 6 shows an optoelectronic device 50 with a specific configuration of optical tube 55.

In this case, non-straight curve followed by intermediate portion 64 of chamber wall 62 in a (first) half-section (again, at the left-hand side of the figure) is or follows, at least approximately, a portion of an ellipse. Note the above definition of approximation.

In the case shown, one focus 75 of ellipse is at the boundary point 72 of first aperture 58 in the opposite half-section. However, it may also be farther from optical axis 56 than such boundary point 72 (namely, to its right in FIG. 6), as further discussed below.

Another focus 76 of ellipse is farther from optical axis 56 than boundary point 68 of second aperture 59 in the first half-section (namely, to the left of boundary point 68 in FIG. 6). However, it may also be at such boundary point 68, as further discussed below.

Second focus 76 is at a distance D3 from boundary point 68 of second aperture 59, which is sized as discussed above in connection with FIG. 5.

Indeed, ellipse focus 76 plays the role, in the illustrated case of first focus 75 of ellipse being placed at boundary point 72 of first aperture 58 in the opposite half-section, of impingement point Q discussed above, namely of impingement point Q of a light ray 71 incoming from that boundary point 72 or focus 75, and reflected at any point P of intermediate portion 64 of chamber wall 62. This is illustrated by way of an example by the further path 77, 78 of a light ray incoming from boundary point 72 or focus 75, and reflected at another point P1 of intermediate portion 64.

Accordingly, the further property that all impingement points Q—i.e. those corresponding to a light ray incoming from the boundary point 72 of first aperture 58 in the opposite half-section—are concentrated essentially in a single impingement point is met.

Accordingly, advantageously, for each point P of intermediate portion 64 of chamber wall 62 having the shape shown in FIG. 6 and described above, stray light incoming from within the first aperture 58 will be reflected in the neighborhood of second focus 76 (in a spot which point closest to optical axis 56 is second focus 76), and stray light incoming from the second aperture 59 will be reflected in the neighborhood of first focus 75 at the chamber wall 62 in the opposite half-section. In both cases, stray light will impinge at least twice and preferably at least three times on chamber wall 62, be attenuated thereby, and possibly totally suppressed.

Intermediate portion 64 of chamber wall 62 may also follow ellipses departing from the ellipse described thus far.

In the configuration shown, ellipse major axis 79 is skewed with respect to optical axis 56, forming an angle DELTA therewith. When either or both ellipse focuses 75, 76 are displaced as discussed above from the respective positions shown in FIG. 6, angle DELTA may increase or decrease: it will be at a minimum when the second focus 76 is at a null distance D3 and the first focus 75 is at boundary point 72; it will be at a maximum when the second focus 76 is at the largest distance D3 and the first focus 75 is farther from optical axis 56, at an upper limit of a possible distance D4 from boundary point 72 (along dotted line 80). As far as size of distance D4 is concerned, what has been said in respect of distance D3 applies.

It shall be emphasized that second focus 76 may lie on a plane orthogonal to optical axis 56 and containing second aperture 59, or it can be more distal or more proximal than second aperture 59; similarly, first focus 75 may lie on a plane orthogonal to optical axis 56 and containing first aperture 58, or it can be more distal or more proximal than first aperture 58. First focus 75 is preferably more proximal than or at the first line 65. Second focus 76 is preferably more distal than or at the second line 67. The focuses 75, 76 may lie on chamber wall 62, within optical chamber 57 or outside of the optical chamber 57.

Ellipse eccentricity is preferably such that the ellipse passes through the boundary point 66 of first aperture 58 in the first half-section, but this is not mandatory. Furthermore, it is unimportant that the intermediate portion 64 itself passes for that point: what has been said in respect of first plane or line 65 still applies. However, preferably eccentricity is selected based on the largest value that would keep the entire first aperture 58 inside the ellipse and possibly reduced in order to include it with a margin of maximum 3 mm, preferably maximum 2 mm, even more preferably maximum 1 mm. The minor axis of the ellipse, and as a consequence the size of optical chamber 57 in direction X orthogonal to optical axis 56 in the first half-section, decreases when the eccentricity of the ellipse increases.

The size D1 of the optical chamber 57 in the direction Y along optical axis 56 is related to the distance between the two foci 75, 76, thus also to the eccentricity. The size of the chamber 57 in both directions X, Y also depends on the inclination angle DELTA of ellipse axis 79, and thus on the distances D3 and D4.

The actual shape and size of the ellipse can therefore be easily selected and adjusted to the best compromise according to the actual space constraints.

A practical elliptical shape can be conveniently calculated in order to optimize one or more parameters when one or more other parameters are set as a design constraint. Among the main parameters, there are the distance D1 between the first and second apertures 58, 59; the distances D3 and D4; the size of the first and second apertures 58, 59 in the half-section considered; the distance D2 between the second aperture 59 and the third aperture 61, if second chamber 60 is present; the desired eccentricity; the width D5 of the optical chamber 57 in the half-section considered.

It is important to point out that the design of ellipse, or generally of nonstraight curve followed by intermediate portion 64 of chamber wall 62, is independent of the specific type of transducer 51, namely is essentially independent of the shape and dimension of an LED or photodiode used as transducer 51.

An ellipse having the first focus 75 at the boundary point 72 of first aperture 58 in the opposite half-section, the second focus 76 at the boundary point 68 of second aperture 59 in the first half-section, namely having null distances D3 and D4, and passing from the boundary point 66 of first aperture 58 in the first half-section may also be taken as a reference ellipse in respect of another advantageous optional property of intermediate portion 64 of chamber wall 62: the latter may follow any non-straight curve (having the property that impingement point Q is in the first half-section and more distal than second line 67) that has a maximum distance to the closest portion of reference ellipse, as measured along a direction X orthogonal to the optical axis 56, which is less than or equal to 4 mm, preferably less than or equal to 3 mm, and/or less than or equal to 27% of the resolution, preferably less than or equal to 20% of the resolution in the case of an optical device part of a light barrier.

With reference again also to FIG. 5, in the first half-section, chamber wall 62 may follow, for a portion 81 more distal than second line 67, a straight line which is parallel to or skewed towards optical axis when looking in the direction from proximal to distal (from bottom to top of FIGS. 5 and 6), thus "trimming" somehow an ellipse or a general curve as discussed above, in the half-section considered. This allows reducing the size of optical chamber 57 in direction X, without adversely affecting stray light suppression. The angle between such distal portion 81 of chamber wall 62 and optical axis 56 is preferably included in the range 0-60°, preferably in the range 0-45°, even preferably 0-30°.

Chamber wall 62 may, alternatively or additionally to more distal portion 81, include a distalmost wall portion 82 forming an undercut region of optical chamber 57, when looking towards the first aperture 58 along the direction of optical axis 56 (from top to bottom in FIGS. 5 and 6), the second aperture 59 being formed in such a distalmost wall portion 82. Impingement points Q, Q1 will generally lie on distalmost, undercut wall portion 82. It shall be noted that when more distal portion 81 is skewed towards optical axis 56, it may also embody, at least in part, distalmost wall portion 82.

When there are both a portion 81 straight and parallel to optical axis or converging as discussed above, and a distalmost wall portion 82 which is planar, they preferably form a 90° angle or an obtuse angle therebetween, which is mechanically easier to obtain than acute angles.

When second chamber 60 is present, distalmost wall portion 82 is preferably a diaphragm arranged at an intermediate (not necessarily equidistant from the ends) location along optical tube 55.

Figure 8:
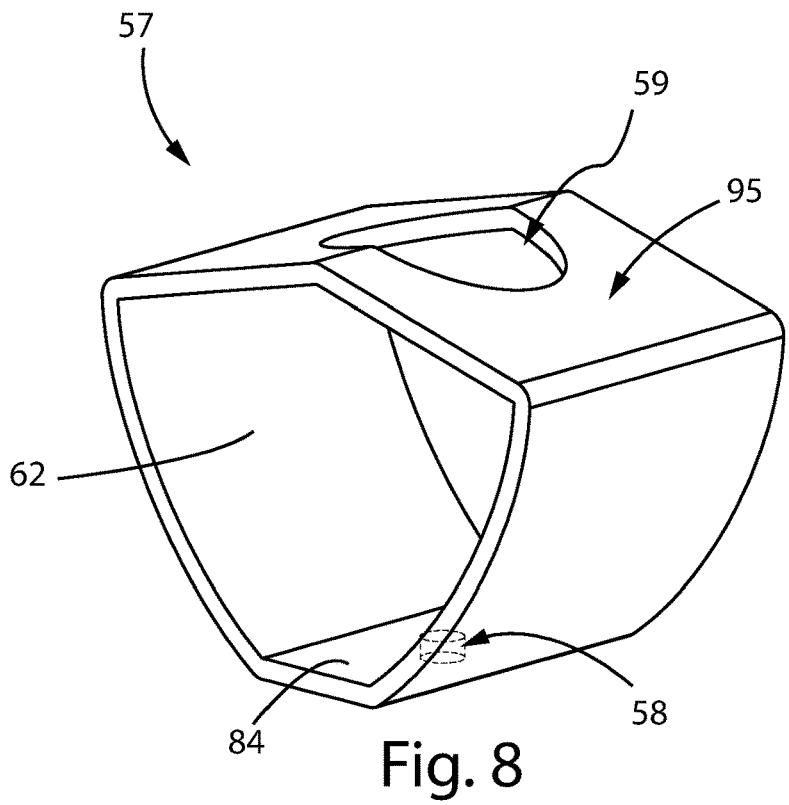
Figure 9:
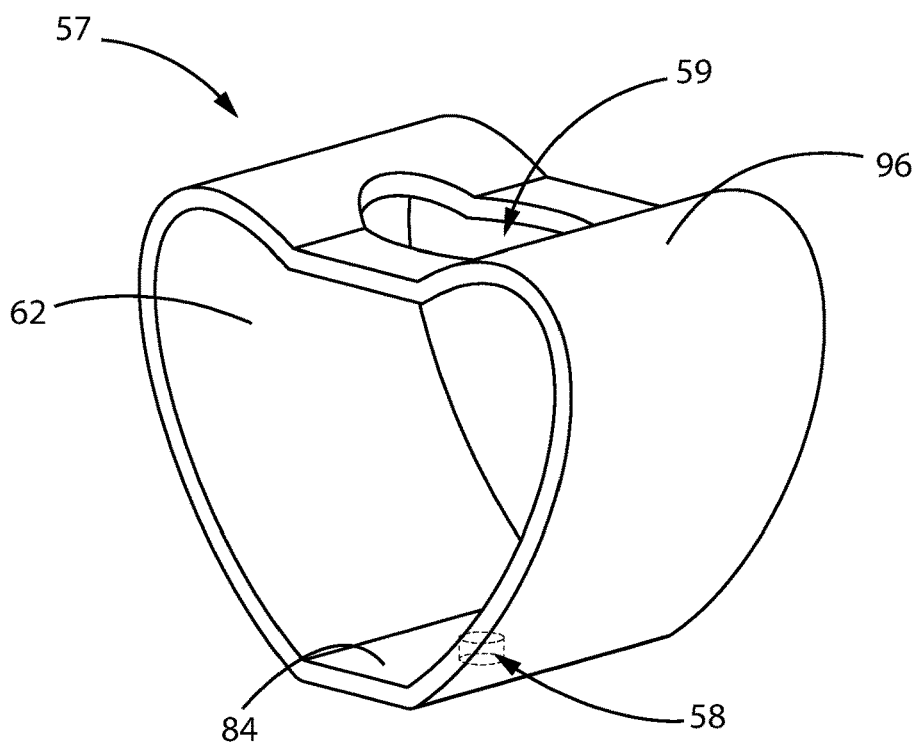

Distalmost wall portion 82 may be, but is not necessarily planar as shown in FIGS. 5 and 6. Exemplary optical chambers including a non-planar distal wall portion are shown in FIGS. 8, 9.

In the first half-section, chamber wall 62 may (alternatively or additionally to the portions other than intermediate portion 64 described thus far) follow, for a portion 83 more proximal than first line 65, a straight line which is parallel to or skewed with towards optical axis 56 when looking in the direction from distal to proximal (from top to bottom of FIGS. 5 and 6), thus "cutting" somehow an ellipse or a general curve as discussed above, in the half-section considered, also in the proximal part. Such a more proximal portion 83 does not adversely affect stray light suppression, rather may help it by somehow "scrambling" the light rays thereby removing some effects that a chamber wall 62 fully meeting the above constraints as to its local tangent 69 may not properly account for. Said "side effects" are mainly light rays reflected multiple times within chamber 57, that are no longer controlled because their light paths depend i.a. on the fine structure of the whole chamber wall 62, and are not easy to foresee, though they might be recognized through computer simulation of the optical behavior of a design chamber 57, and corrected through more proximal portion 83, as well as to above mentioned more distal portion 81.

Chamber wall 62 may, alternatively or additionally to the portions other than intermediate portion 64 described thus far, include a proximalmost wall portion 84 forming an undercut region of optical chamber 57, when looking towards the second aperture 59 along the direction of optical axis 56 (from bottom to top in FIGS. 5 and 6), the first aperture 58 being formed in such a proximalmost wall portion 84. It shall be noted that when more proximal portion 83 is skewed towards optical axis 56, it may also embody, at least in part, proximalmost wall portion 84. Proximalmost wall portion 84 aids the manufacturability of the optical tube assembly 52. Exemplary optical chambers including such a portion are shown in later discussed FIGS. 7-12.

Turning back to intermediate portion 64 of chamber wall 62, non-straight curve followed thereby in at least one half-section taken along optical axis 56 or along an axis parallel to optical axis 56, may also be or at least approximately follow a portion of a parabola. What has been stated in respect of the portions other than intermediate portion still applies in general, as further discussed below.

Figure 7:
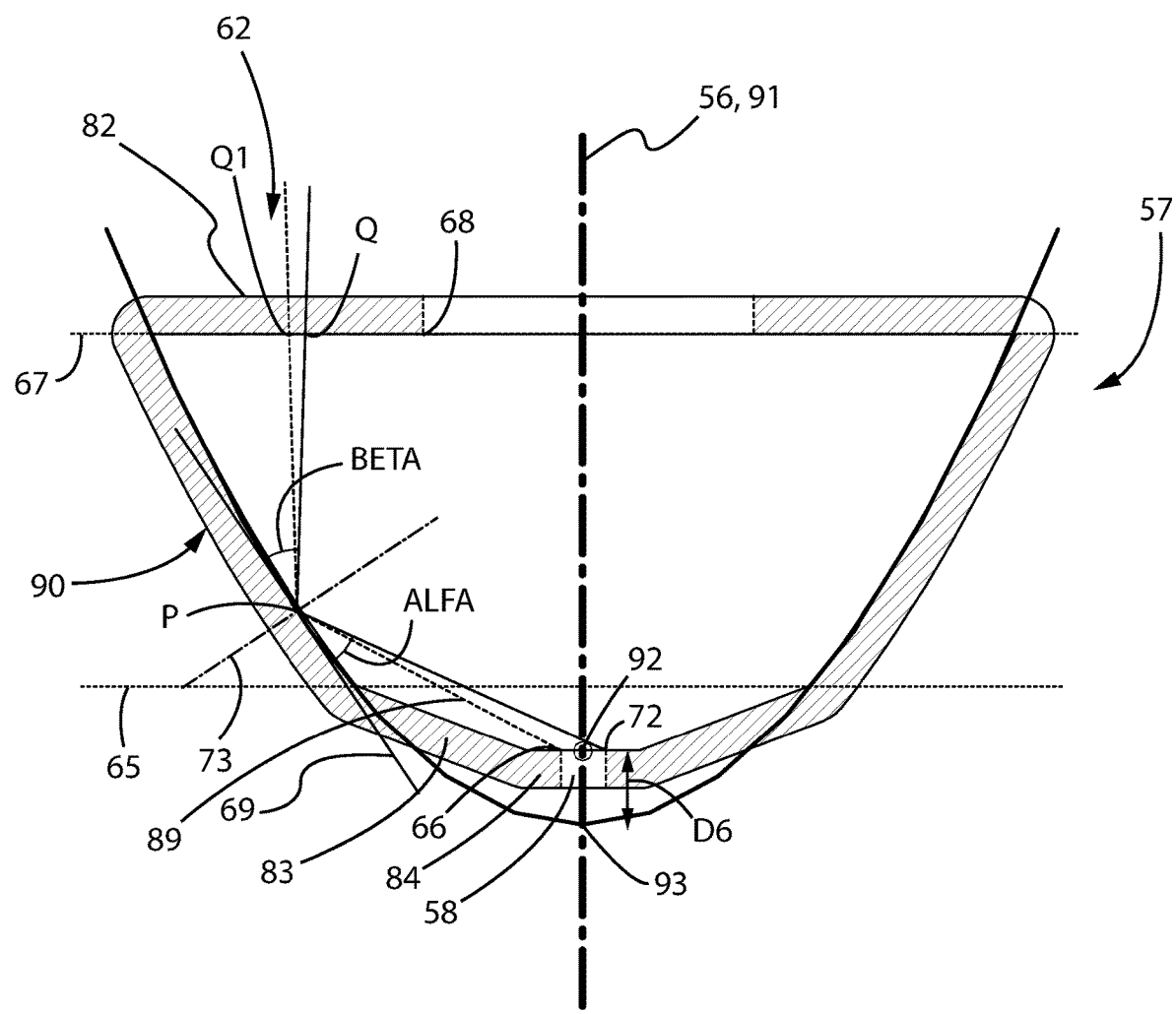

For the sake of simplicity, only the outline of a cross-section of optical chamber 57 taken in a plane including (or parallel to) optical axis 56 is diagrammatically shown in FIG. 7, showing such a parabola-shaped intermediate portion 90.

The parabola axis 91 may coincide with the optical axis 56 as shown, but it may also be parallel thereto or inclined therewith, similarly to ellipse axis 79.

In the case shown, the parabola axis 91 passes within both the first aperture 58 and the second aperture 59, but it may also pass within just one of the first aperture 58 and the second aperture 59.

Parabola focus 92 is, in the configuration of FIG. 7, as distal as the boundary point 72 of the first aperture 58 in the first half-section; however this is not mandatory and parabola focus 92 may also be more distal than boundary point 72.

Parabola vertex 93 is, in the configuration of FIG. 7, more proximal than the boundary point 72 of the first aperture 58 in the first half-section; however this is not mandatory and parabola vertex 93 may also be as proximal as boundary point 72. Parabola vertex 93 may even be on the other side of the transducer 51.

Focus 92 and vertex 93 are chosen so that the parabola is enough wide as to be farther from optical axis 56 than the boundary points 66, 68 of the first and second apertures 58, 59 in the first half-section (namely so that both apertures 58, 59 are completely included in the parabola, in the half-section considered). A distance D6 between the focus 92 and the vertex 93 is less than or equal to twice the size of the first aperture 58 in the first half-section and/or less than or equal to 20% of the resolution, in the case of an optical device part of a light barrier.

In the case shown in FIG. 7, chamber wall 62 does include a distalmost wall portion 82 forming an undercut region, whereat the second aperture 59 is formed. Such a distalmost wall portion 82 is necessary for impingement points Q, Q1 to meet the above stated properties. However, distalmost wall portion 82 need not be orthogonal to optical axis 56 as shown.

In the case shown in FIG. 7, chamber wall 62 also includes a more proximal wall portion 83 and a proximal-most wall portion 84 as discussed above, neither of which is however mandatory.

Also for parabola-shaped intermediate portion 90 of chamber wall 92, the local tangent 69 at each point P is oriented so that a stray light ray 88 incoming from the boundary 72 of the first aperture 58 in the opposite halfsection, is so deviated at that point P as to impinge upon the chamber wall 62, at a respective point Q that is in said first half-section and more distal than second line 67. Stray light rays incoming from within the first aperture 58 will impinge at a point further from optical axis 56 (and thus further from second aperture 59) than point Q, as shown by stray light ray 89 incoming from the boundary point 66 of the first aperture 58 in the first half-section and being reflected at P to imping at point Q1. The impingement points Q for all points P will be at a distance D3 from boundary point 68 of second aperture 59 in the first half-section; in respect of distance D3, what has been stated above still applies.

Stray light incoming from either the first or the second apertures 58, 59 will thus be internally reflected, thus attenuated and suppressed to a convenient level, if not completely, as discussed above in connection with FIGS. 5 and 6.

Intermediate portion 90 of chamber wall 62 need not follow exactly a parabola, it may follow an approximation of a parabola.

More in general, the intermediate portion of chamber wall 62, in at least one half-section taken along optical axis 56 or along an axis parallel to optical axis 56, may be a conical curve with conic constant comprised in the range of higher than or equal to −1 and lower than 0. Preferably, the curve axis or axes lie(s) in a same plane as the first half-section.

When the conic constant differs from −1, a major axis of the conical curve may cross the chamber wall 62 both in said first half-section, possibly at the boundary point 68 of the second aperture 59, and in the opposite halfsection, possibly at the boundary point 72 of the first aperture 58. The major axis will thus not pass through any of the two apertures. Instead, in the case of conic constant equal to −1, the axis more conveniently passes through at least one of the apertures 58, 59.

While a parabola-shaped intermediate portion 90 of chamber wall 62 has the above discussed property of high suppression of stray light, a resulting chamber 57 is larger than when it is ellipse-shaped, the size of apertures 58, 59 and their distance D1 being the same.

In a practical configuration, the intermediate portion 64, 90 of chamber wall 62 may approximate such a conical curve, or any of the configurations described herein in a geometrical way. Notably, a given geometrical curve, or a portion thereof, may e.g. be approximated by a piecewise-linear curve. Irrespectively of the shape of the intermediate portion of chamber wall 62, as well as irrespectively of whether and which other portions chamber wall has, the distalmost wall portion, wherein second aperture 59 is formed, need not be planar, as mentioned. Just by way of an example, a few alternative shapes are shown in FIGS. 8, 9. The same figures also show further examples of optical chambers including a wall portion 84 straight and orthogonal with respect to optical axis 56, wherein the first aperture 58 is formed.

FIG. 8 diagrammatically shows an optical chamber 57 wherein the second aperture 59 is formed in a roof-shaped distalmost wall portion 95.

FIG. 9 diagrammatically shows an optical chamber 57 wherein the second aperture 59 is formed in part in a curved distalmost wall portion 96.

Curved distalmost wall portion 96 may in particular follow part of the same ellipse as is optionally followed by the intermediate wall portion 64. Stated in other words, the ellipse curve may extend more distally than the second line 67 and reach the second aperture 59 (in the half-sections that are actually interested by the second aperture 59). However, the curve followed by curved distalmost wall portion 96 may be whatever, preferably having a concavity towards the inside of optical chamber 57.

Figure 10:
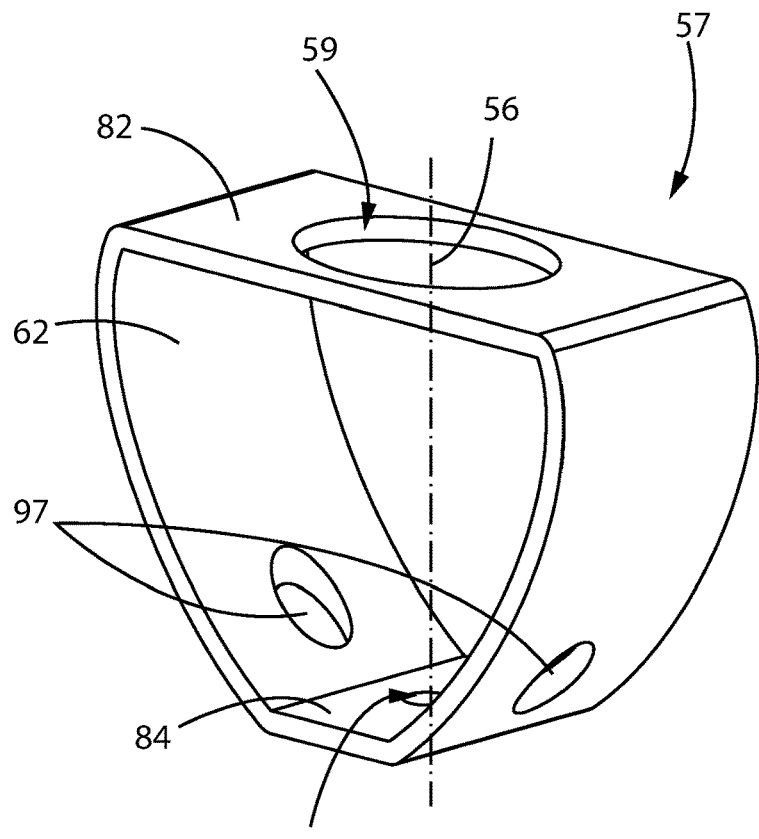

FIG. 10 diagrammatically shows an optical chamber 57 wherein one or more openings 97 (two being shown by way of an example) are provided in chamber wall 62, across a plane including optical axis 56.

Stray light is advantageously allowed to exit from opening(s) 97.

One or more stray-light-exit openings may also be formed in other locations, alternatively or additionally to openings formed across a plane including optical axis 97.

Though optical chamber 57 shown in FIG. 10 includes a planar distalmost wall portion 82, and includes a planar proximalmost wall portion 84 straight and orthogonal with respect to optical axis 56, this is not mandatory, and all of the above and following alternative shapes of optical chamber 57 and portions of its wall 62 may include one or more stray-light-exit openings similar to openings 97.

It is noted that the optical chamber 57 shown in FIG. 10 has an intermediate portion that follows the discussed non-straight curve in at least one halfsection, which is taken along an axis parallel to optical axis 56.

Figure 11:
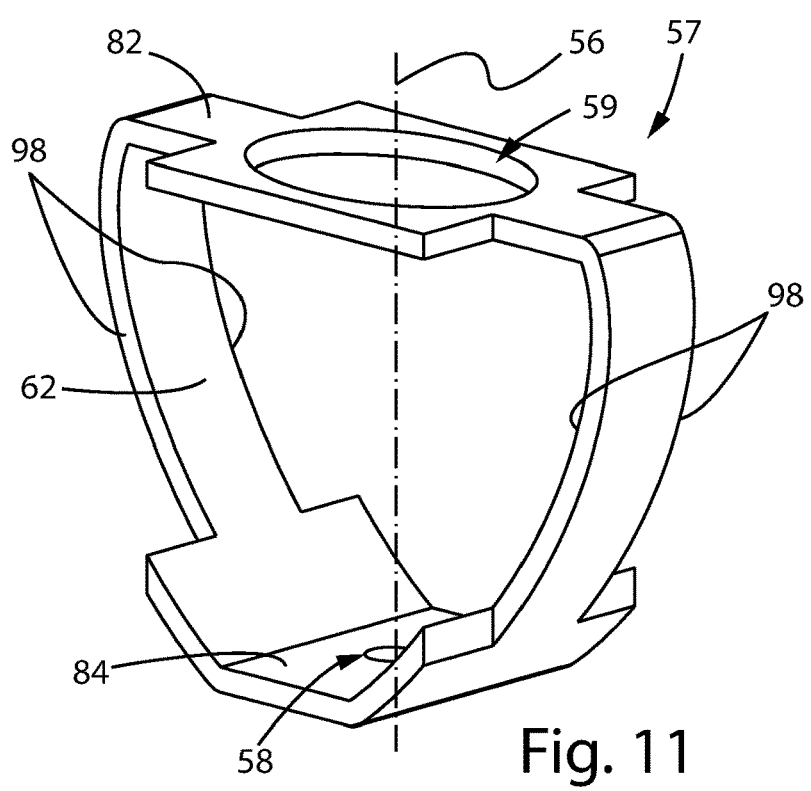

FIG. 11 diagrammatically shows an optical chamber 57 wherein one or more cutouts 98 (four being shown by way of an example) are provided in chamber wall 62. Cutouts 98 play the same role as openings 97, and the specific configuration of chamber 57 shown has to be considered as merely illustrative. Furthermore, an optical chamber 57 may include both one or more stray-light-exit opening and one or more stray-light-exit cutout.

Figure 12:
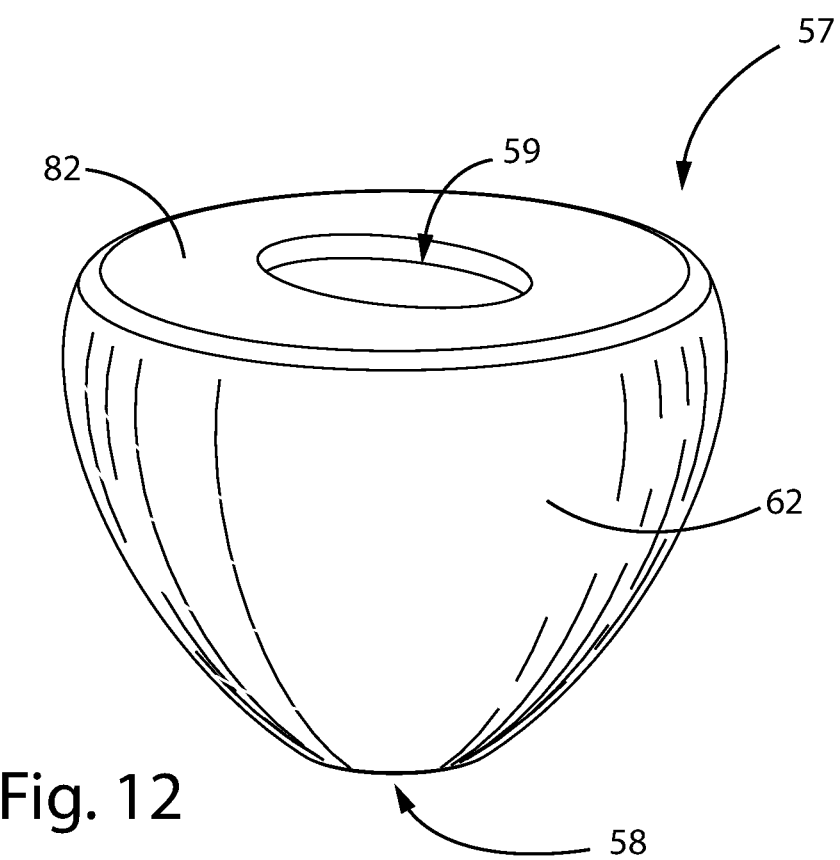

FIG. 12 diagrammatically shows how chamber wall 62 may also include an intermediate portion that follows a non-straight curve as discussed in all halfsections taken in a plane including optical axis 56—or in most of them, when stray-light-exit openings 97 and/or cutouts 98 are provided.

It is possible to obtain the shape of chamber wall 62 by rotation of a curve including the desired non-straight curve about optical axis 56. Chamber wall 62 is thus a solid of revolution with non-straight curve as at least part of the generatrix. This generally requires optical chamber 57, as well as optical tube 55, to be formed by joining two separate elements to form undercut wall portions.

Though optical chamber 57 shown in FIG. 12 includes a planar distalmost wall portion 82, this is not mandatory, and all of the above and following alternative shapes of optical chamber 57 and portions of its wall 62 may be used in a revolution-like optical chamber 57, which may also include one or more stray-light-exit opening(s) 97 and/or cutouts 98.

On the other hand, when the intermediate portion of chamber wall 62 follows a non-straight curve as discussed above in half-sections of parallel planes (FIG. 5, 6, 8-11) spanning the entire optical chamber 57, apart from possible stray-light-exit openings and/or cutouts, it is possible to obtain the shape of chamber wall 62 by translation of the curve, preferably along a direction essentially orthogonal to the optical axis 56 as shown. This allows optical chamber 57, as well as optical tube 55, to be easily obtained by injection molding in a mold comprising a side slide. The optical chamber 57 may be either closed at the end face opposite the entry face of the side slide, or open at both end faces (as shown).

In the case of an optoelectronic device 50 part of a light barrier, the first halfsection preferably lies in a plane XY including optical axis 56 or propagation direction Y and lengthwise direction X, or is parallel to such a plane XY.

In the case of an optoelectronic device 50 part of a photocell, chamber wall 62 may be a solid of revolution, the first half-section being any half-section taken in a plane including optical axis 56, or almost any if stray-light-exit openings 97 and/or cutouts 98 are provided.

As said above, optical tube 55 may just include or be comprised of optical chamber 57, second optical chamber 60 being optional.

Figure 13:
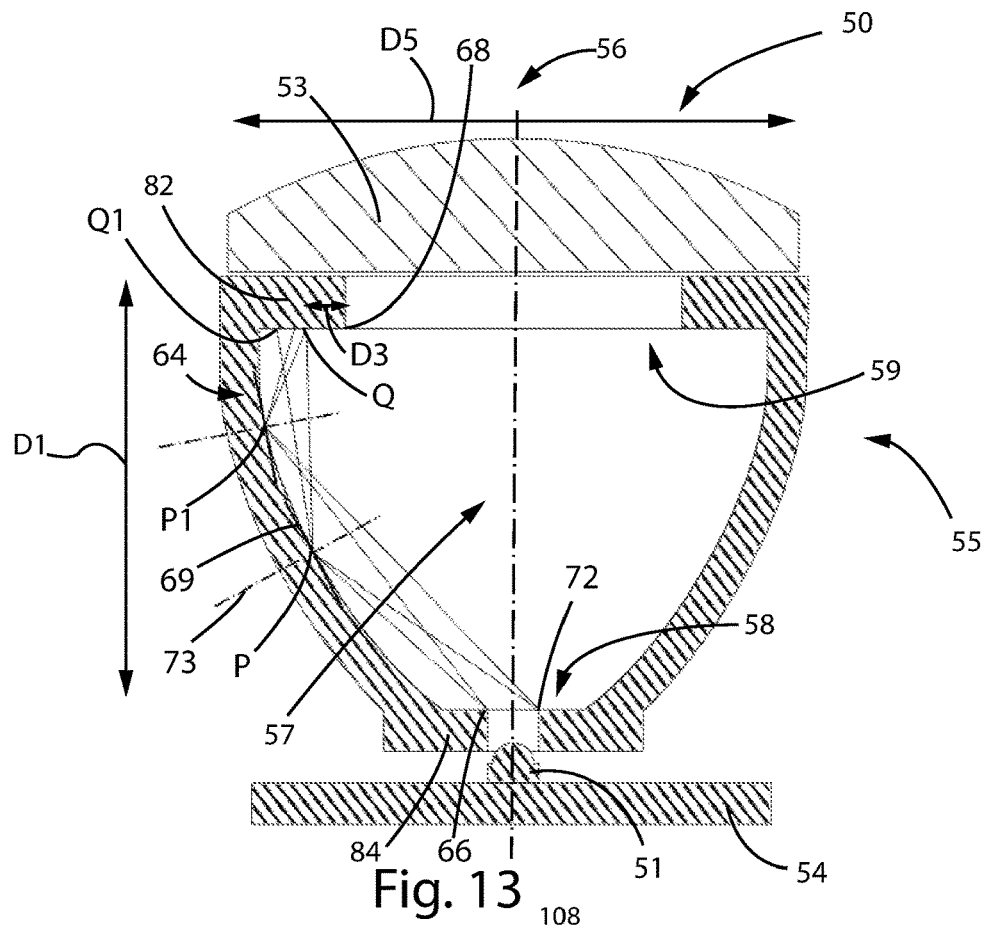

FIG. 13 diagrammatically shows an optoelectronic device 50 including such an optical tube 55 comprised of optical chamber 57, besides a transducer 51. In the case shown, lens 53 is also present by way of an example.

Second aperture 59 forms the distal aperture of optical tube 55. In the case shown, second aperture 59 is formed in a planar distalmost wall portion 82, that forms an undercut, and first aperture 58 is formed in a proximalmost wall portion 84 straight and orthogonal with respect to optical axis 56 but this is not mandatory, all what has been stated above applying.

The actual shape of non-straight curve followed by the chamber wall 62 may be different from an ellipse as shown.

As shown, stray light is confined within the optical chamber 57, and may not exit the second aperture 59. While the case of stray light coming from an ETO transducer 51 is shown, the same holds true for the case of an OTE transducer 51, that will not be reached by any stray light incoming from the second aperture 59.

Figure 14:
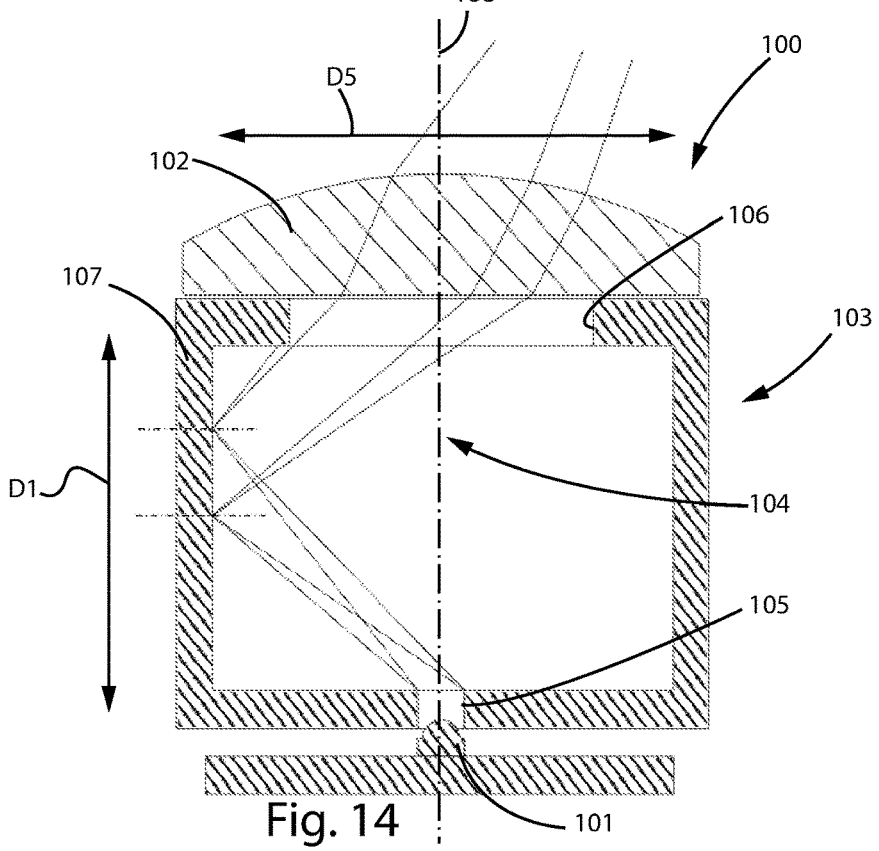

FIG. 14 shows, by way of comparative example, an optoelectronic device 100 including an ETO transducer 101, a lens 102 and an optical tube 103 including a single chamber 104 having a first aperture 105, and a second aperture 106. Optical chamber 104 has straight lateral walls 107. The size of apertures 105, 106 and their distance D1 is the same as the corresponding elements in FIG. 13.

It can be seen that, when optical chamber 104 has the same size D5 in the direction orthogonal to optical axis 108 as the optical chamber 57 in FIG. 13, at least those light rays impinging at a medium height of chamber walls 107 are reflected into second aperture 106 and therefore exit the optical tube 103 through lens 102, as undesired stray light rays that do not follow the intended light path.

In order to avoid this, optical chamber 104 would need to be formed of a much larger size D5 than optical chamber 57 of FIG. 13.

It is to be noted that, even if present, second optical chamber 60 is less critical because the angle of aperture of the beam of emitted light has already been limited by the first, proximal optical chamber 57—and the angle of aperture of beam of received light will downstream be limited by the first, proximal optical chamber 57. The second optical chamber 60 may therefore have straight lateral walls in the half-section. Thus, second optical chamber 60, if present, may be parallelepiped-shaped or cylindrical.

However, it may also be flared or tapered, such as conical, or have other shapes.

Previously, specular reflection at chamber wall 62 has been mostly considered, and diffuse reflection has been neglected. Chamber wall 62 will preferably be reflective and/or highly attenuating.

Irrespectively of its shape, optical chamber 57 preferably has a reflective finish, preferably a smooth, specularly reflective finish. Preferably the chamber wall 62 is made of black glossy plastic. Alternatively, it may be made of any suitable material, painted to have the same surface finish. Preferably the surface roughness is Ra≤0.63 µm, more preferably Ra≤0.4 µm.

Diffusion at the chamber wall 62, and roughness thereof, would generate light rays that are not controlled as intended and should be avoided. The material forming the chamber wall 62 should also be as good an absorber as possible, so that even if some rays are still able to reach either aperture 58, 59 after a certain number of reflections (which is in any case greater than 2 or even greater than 3 with the above shapes), the rays will be very weak.

The above is a description of various inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

In the present description and in the following claims, all of the numerical magnitudes indicating quantities, parameters, percentages, and so on should in all circumstances be deemed to be preceded by term "about", unless otherwise indicated. Furthermore, all of the ranges of numerical magnitudes include all of the possible combinations of maximum and minimum numerical values and all of the possible intermediate ranges, besides those specifically indicated herein. Extremes of ranges are meant to be included in the range, unless otherwise stated.

Unless the context requires otherwise, throughout the specification and claims: forms of verb "comprise" are to be construed in an open, inclusive sense, as "include, but not be limited to"; singular forms "a," "an," and "the" are to be construed in an open, inclusive sense, not limited to "a single one"; term "or" is generally employed in its broadest sense, as "and/or".

The invention claimed is:

1. An optoelectronic device, comprising:
   a transducer having an optical axis;
   an optical tube assembly including:
     an optical tube comprising an optical chamber, the optical chamber including a chamber wall;
     a first aperture in the chamber wall proximal with respect to the transducer; and
     a second aperture in the chamber wall distal with respect to the transducer, the first and second apertures being at least substantially coaxial along the optical axis and separated by a first distance (D1) along the optical axis, the second aperture having a diameter less than a diameter of the optical chamber, and wherein light entering or exiting the transducer has an unobstructed direct path within the optical chamber along the optical axis;
   wherein at least one first half-section taken along optical axis or along a direction parallel to optical axis:
     at least an intermediate portion of the chamber wall, extending between (i) a first line orthogonal to optical axis and more distal than or including a boundary point of the first aperture and (ii) a second line orthogonal to optical axis and more proximal than a boundary point of the second aperture, follows a non-straight curve, wherein a local tangent to an intermediate portion at each point (P) is oriented so that stray light rays incoming from the boundary point of the first aperture in the opposite half-section would be so deviated at that point (P) as to impinge upon the chamber wall, an impingement point (Q) of the stray light ray being in the first half-section and more distal than the second line such that stray light is reflected at least twice within the optical chamber.

2. The optoelectronic device according to claim 1, wherein the impingement point is proximate to the boundary point of the second aperture in the first half-section.

3. The optoelectronic device according to claim 1, wherein the non-straight curve is a substantially conical curve with conic constant comprised in the range of higher than or equal to −1 and lower than 0.

4. The optoelectronic device of claim 3, wherein when the conic constant differs from −1, a major axis of the conical curve crosses the chamber wall both in the first half-section, at the boundary point of the second aperture, and in the opposite half-section, at the boundary point of the first aperture, while when the conic constant is equal to −1, the axis passes through at least one of the first and second apertures.

5. The optoelectronic device according to claim 3, wherein the non-straight curve at least substantially follows a portion of an ellipse, wherein:
   a first focus of ellipse is at or farther from optical axis than the boundary point of first aperture in the opposite half-section, and
   a second focus of ellipse is at or farther from optical axis than boundary point of second aperture in the first half-section.

6. The optoelectronic device according to claim 5, wherein the second focus is at a third distance (D3) from the boundary point of second aperture in the first half-section that is smaller than or equal to 27% of the resolution, in the case of an optical device part of a light barrier.

7. The optoelectronic device of claim 1, wherein, considering a reference ellipse having the first focus at the boundary point of first aperture in the opposite half-section, the second focus at the boundary point of second aperture in said first half-section, and passing from the boundary point of first aperture in the first half-section, the maximum distance of non-straight curve and the closest portion of reference ellipse, as measured along a direction orthogonal to the optical axis, is less than or equal to 4 mm, and/or less than or equal to 27% of the resolution.

8. The optoelectronic device of claim 1, wherein the chamber wall further comprises a distalmost wall portion forming an undercut region of optical chamber, when looking towards the first aperture along the direction of optical axis, the second aperture being formed in such a distalmost wall portion.

9. The optoelectronic device claim 1, wherein the non-straight curve at least substantially follows a portion of a parabola, wherein:
   a fifth distance (D5) between the focus and the vertex is less than or equal to twice the size of the first aperture in the first half-section, and/or less than or equal to 20% of the resolution, in the case of an optical device part of a light barrier, and
   the focus is as distal as, or more distal than the boundary point of the first aperture in the first half-section, and vertex is as proximal as, or more proximal than, the boundary point of the first aperture in the first half-section, or even it is on the other side of the transducer and
   the parabola axis passes within at least one of the first aperture and the second aperture.

10. The optoelectronic device of claim 1, wherein the chamber wall comprises at least one stray-light-exit opening or cutout.

11. The optoelectronic device of claim 1, wherein the chamber wall is a solid having non-straight curve as at least part of the generatrix, translated perpendicularly to optical axis, and in widthwise direction (Z) in the case of an optical device part of a light barrier, optical tube assembly.

12. The optoelectronic device of claim 1, wherein the chamber wall has a reflective finish.

13. The optoelectronic device of claim 1, wherein the optical tube further includes a second optical chamber distal to the optical chamber, the second optical chamber including the second aperture and a third aperture at least substantially coaxial with and more distal than the second aperture.

14. The optoelectronic device of claim 1, further including a converging lens at a distal end of optical tube.

15. An optoelectronic light barrier comprising a plurality of paired emitter and receiver optoelectronic devices, at least one of the emitter optoelectronic devices or of the receiver optoelectronic devices comprising:
 a transducer disposed on a support substrate; and
 an optical tube having a first end proximate to the transducer, the optical tube extending along an optical axis and comprising:
  a first optical chamber disposed between a first aperture and a second aperture, the second aperture having a diameter less than a diameter of the optical chamber, and wherein light entering or exiting the transducer has an unobstructed direct path within the first optical chamber along the optical axis; and
  a second optical chamber disposed between the second aperture and a distal end of the optical tube, wherein at least a portion of a chamber wall within the first optical chamber follows a non-straight curve such that stray light is reflected at least twice within the first optical chamber.

16. The optoelectronic light barrier of claim 15, wherein the at least a portion of the chamber wall that follows a non-straight curve is disposed between two portions of the chamber wall that follows a straight line.

17. The optoelectronic light barrier of claim 15, wherein the non-straight curve is a portion of an ellipse.

18. The optoelectronic device of claim 12, wherein the reflective finish is a smooth specularly reflective finish.

19. The optoelectronic device of claim 12, wherein the reflective finish is a black glossy plastic.

20. The optoelectronic device of claim 14, wherein the converging lens and the second aperture have a same shape at a different scale.

* * * * *